United States Patent
Cordova et al.

(10) Patent No.: US 10,078,099 B2
(45) Date of Patent: Sep. 18, 2018

(54) METHODS AND SYSTEMS FOR ALIGNING A MOBILE DEVICE TO A VEHICLE

(71) Applicant: CENSIO, INC., Allston, MA (US)

(72) Inventors: Brad Cordova, Cambridge, MA (US); Sanujit Sahoo, Cambridge, MA (US)

(73) Assignee: TRUEMOTION, INC., Boston, MA (US)

(*) Notice: Subject to any disclaimer, the term of this patent is extended or adjusted under 35 U.S.C. 154(b) by 282 days.

(21) Appl. No.: 14/749,232

(22) Filed: Jun. 24, 2015

(65) Prior Publication Data

US 2015/0369836 A1    Dec. 24, 2015

Related U.S. Application Data

(60) Provisional application No. 62/016,439, filed on Jun. 24, 2014, provisional application No. 62/158,301, filed on May 7, 2015.

(51) Int. Cl.
| | |
|---|---|
| *G01P 15/00* | (2006.01) |
| *G01P 15/18* | (2013.01) |
| *G01C 21/16* | (2006.01) |

(52) U.S. Cl.
CPC ............. *G01P 15/18* (2013.01); *G01C 21/16* (2013.01)

(58) Field of Classification Search
CPC .......... G01C 21/16–21/18; G01P 15/00–15/18
See application file for complete search history.

(56) References Cited

U.S. PATENT DOCUMENTS

| | | | |
|---|---|---|---|
| 6,965,397 B1 | 11/2005 | Honey et al. | |
| 7,376,507 B1 | 5/2008 | Daily et al. | |
| 8,825,274 B2* | 9/2014 | De Tommasi | G01C 25/005 |
| | | | 701/31.1 |
| 9,253,603 B1* | 2/2016 | Dong | H04W 4/027 |
| 9,360,323 B2* | 6/2016 | Grokop | G01C 21/165 |
| 9,849,361 B2 | 12/2017 | Coza et al. | |
| 2012/0173195 A1* | 7/2012 | Opshaug | G01C 21/165 |
| | | | 702/151 |
| 2013/0081442 A1* | 4/2013 | Basir | G01P 21/00 |
| | | | 73/1.38 |
| 2013/0110450 A1* | 5/2013 | Kulik | G01C 17/38 |
| | | | 702/141 |
| 2014/0149145 A1* | 5/2014 | Peng | G06F 3/0346 |
| | | | 705/4 |

(Continued)

OTHER PUBLICATIONS

U.S. Appl. No. 15/149,603, "Non-Final Office Action", dated Jan. 11, 2018, 11 pages.

*Primary Examiner* — Eric Ward
(74) *Attorney, Agent, or Firm* — Kilpatrick Townsend & Stockton LLP

(57) ABSTRACT

A method of determining vehicle acceleration information includes obtaining a plurality of movement measurements from a mobile device in a vehicle, and determining a plurality of gravity vectors, each of the plurality of gravity vectors associated with at least two of the plurality of movement measurements. The method further includes removing a movement measurement from the plurality of movement measurements using the plurality of gravity vectors to provide a set of remaining movement measurements. An acceleration measurement for the vehicle is determined using the remaining movement measurements.

20 Claims, 21 Drawing Sheets

(56) References Cited

U.S. PATENT DOCUMENTS

2014/0278206 A1* 9/2014 Girod .................... G01C 15/00
 702/141
2015/0088419 A1* 3/2015 Bhardwaj ............ G01C 21/165
 701/472
2016/0325756 A1 11/2016 Cordova et al.

* cited by examiner

300

| | | |
|---|---|---|
| $q_t$ | : | Current quaternion state |
| $q_{t-1}$ | : | Previous quaternion state |
| $\Delta t$ | : | Time step |
| $\Omega(w)$ | : | Angular velocity matrix |
| $Q_{t-1}$ | : | Process noise covariance |
| $K_t$ | : | Kalman matrix |
| $\tilde{P}_t$ | : | A priori error covariance |
| $P_t$ | : | Error covariance |
| $A$ | : | State time evolution matrix |
| $R$ | : | Direction cosine matrix |
| $\bar{g}$ | : | Gravity vector |
| $I$ | : | 4 x 4 identity matrix |
| $\bar{a}$ | : | Acceleration vector (from accelerometer) |
| $w$ | : | Rotation rate vector (from gyroscope) |

Update the process noise covariance matrix ($Q_{t-1}$) based on the current quaternion ($q_t$), and the covariance matrix of measurement noise ($\Sigma_G$) for the gyroscope $$Q_{t-1} = \left(\frac{\Delta t}{2}\right)^2 \Theta_{t-1} \Sigma_G \Theta_{t-1}^T + \Sigma_G \quad \text{covariance matrix of the gyroscope measurement noise}$$

$$\Theta = \begin{bmatrix} q_3 & -q_2 & q_1 \\ q_2 & q_3 & -q_0 \\ q_1 & q_0 & q_3 \\ -q_0 & -q_1 & q_2 \end{bmatrix}$$

370

Repeat from stage 320 until end signal

*FIG. 3E*

| Index | Feature | Description |
|---|---|---|
| 1 | acc_med_filt | acceleration from median filter gps |
| 2 | accel_ang | acc_med_filt * angular_speed (median filtered) |
| 3 | accel_cube | positive acceleration cube (median filtered) |
| 4 | accel_fourth | positive acceleration power 4 (median filtered) |
| 5 | accel_speed | acc_med_filt * speed_med_filt |
| 6 | accel_square | positive acceleration squared (med filtered) |
| 7 | acceleration | acceleration at equally spaced distance |
| 8 | acceleration_per_duration | averaged (over distance) count of acceleration > 0.5 m/s^2 |
| 9 | angular_speed | medium filtered heading time derivative (difference) |
| 10 | brakes_per_duration | averaged (over distance) count of acceleration < -0.5 m/s^2 |
| 11 | decel_cube | neg_acc_med_filt cube |
| 12 | decel_fourth | neg_acc_med_filt ** 4 |
| 13 | decel_square | neg_acc_med_filt ** 2 |
| 14 | dist_acc_squared | distance-sampled acceleration squared |
| 15 | dist_turn | heading change per sampled distance |
| 16 | dist_turn_squared | dist_turn squared (treats left/right turns equally) |

*FIG. 13A*

| Index | Feature | Description |
|---|---|---|
| 17 | double_accel | positive acceleration[n] * acceleration[n+1] |
| 18 | double_decel | negative acceleration[n] * acceleration[n+1] (deceleration) |
| 19 | fast_duration_perc | averaged over trip duration of speed > 0.9 max(speed) |
| 20 | fast_duration_thr_perc | averaged over trip duration of instances of speed > 20m/s |
| 21 | hard_accelerations_per_dur | averaged over distance count of acceleration > 1.5m/s^2 |
| 22 | hard_brakes_per_duration | averaged count over distance of acceleration < -1.5 m/s |
| 23 | heading | heading changes over equal distances |
| 24 | heading_diff | absolute value of derivative of heading feature (above) |
| 25 | jerk | time derivative of acceleration |
| 26 | latitude | lat |
| 26 | longitude | lon |
| 27 | neg_acc_med_filt | deceleration from time sampled gps |
| 28 | pos_acc_med_filt | acceleration from time sampled gps |
| 29 | sacceleration | acceleration at speeds below 10 m/s |
| 30 | sjerk | jerk at speeds below 15 m/s |
| 31 | slow_duration_perc | averaged over time speed slower than 1m/s |
| 32 | speed | distance sampled speed |
| 33 | speed_ang | angular speed * median filtered speed |
| 34 | speed_med_filt | median filtered speed |
| 35 | tacceleration | acceleration at turns greater than pi/8 |
| 36 | triple_accel | acceleration * shifted(self,1) * shifted(self,2) |
| 37 | tspeed | speed at turns greated than pi/8 |

*FIG. 13B*

METHODS AND SYSTEMS FOR ALIGNING A MOBILE DEVICE TO A VEHICLE

CROSS-REFERENCES TO RELATED APPLICATIONS

This application claims priority to U.S. Provisional Patent Application No. 62/016,439, currently pending, filed on Jun. 24, 2014, and U.S. Provisional Patent Application No. 62/158,301, currently pending, filed on May 7, 2015, the disclosures of which are hereby incorporated by reference in their entirety for all purposes.

BACKGROUND OF THE INVENTION

For insurance and other purposes, driving behavior has been a topic of interest. Some systems have been developed to track driving behaviors including speed and trip duration. Mobile devices, such as mobile phones, have been used within vehicles to track driving behavior using device sensors. Some insurance companies use a device that plugs into the on-board diagnostic port of a vehicle to read data from the vehicle's computer to better model risk.

Despite the progress made in relation to collecting data related to drivers and their driving behavior using mobile devices, there is a need in the art for improved methods and systems related to tracking driving behavior using a mobile device.

SUMMARY OF THE INVENTION

Embodiments of the present invention relate to transportation systems. More particularly, driving behavior associated with a person is determined. Such data can be utilized in determining risk profiles and other insurance-related computations.

Numerous benefits are achieved by way of the present invention over conventional techniques. In contrast with previous methods that are lacking in the ability to attribute the data collected during the drive to a particular individual, implementations contained within this patent solve several problems by using the ubiquitous smartphone to tell exactly when someone is driving a vehicle. In this way, it is possible to verify that the data being collected is actually attributed to the correct user. For example, embodiments of the present invention provide users with the ability to learn how to improve their driving behaviors while saving money on car insurance. The system can provide feedback about driving behaviors only when a user is a driver (not a passenger), which allows users to prove to insurance companies that they are driving safely. This system also helps insurance companies because it allows them to incentivize safe driving, lowers claim payment variance, and provides for better risk modeling. On a larger scale, the system helps society by reducing accidents. These and other embodiments of the invention along with many of its advantages and features are described in more detail in conjunction with the text below and attached figures.

According to an embodiment, a method of determining vehicle acceleration information is provided. The method includes obtaining a plurality of movement measurements from a mobile device in a vehicle, and determining a plurality of gravity vectors, each of the plurality of gravity vectors associated with at least two of the plurality of movement measurements. The method further includes removing a movement measurement from the plurality of movement measurements using the plurality of gravity vectors to provide a set of remaining movement measurements. An acceleration measurement for the vehicle is determined using the remaining movement measurements.

In an embodiment, at least one of the plurality of gravity vectors is associated with an accelerometer measurement from the mobile device. For example, a mobile device is in a vehicle, the mobile device has an accelerometer, and movement measurements from the accelerometer are used to determine at least one of the plurality of gravity vectors.

In an embodiment, at least one of the plurality of gravity vectors is associated with an accelerometer measurement from the mobile device. For example, a mobile device is in a vehicle, the mobile device has a gyroscope, and movement measurements from the accelerometer are used to determine at least one of the plurality of gravity vectors.

In an embodiment, the removed movement measurement is associated with a change in position of the mobile device within the vehicle. For example, when mobile device collecting data during a drive is moved, the data collected during the time the mobile device was moved, is removed from the data set.

In another embodiment, determining a plurality of gravity vectors includes determining a first and second gravity vector over a time span, determining that a change between the first and second gravity vectors over the time span is above a threshold.

In another embodiment, removing a movement measurement from the plurality of movement measurements includes removing a movement measurement associated with a time span where movement of the mobile device was above a threshold.

In another embodiment, a classifier analyzes movement information received by mobile device sensors and identifies driving features of a driver during a trip, these driving features being used to identify the driver at a later time.

In another embodiment, a classifier is trained with sample data from drives to recognize the driving behavior of a particular user.

In an embodiment, a classifier correlates weather information with driving behavior to identify driving behavior associated with a user that can be used to identify the user at a later time.

BRIEF DESCRIPTION OF THE DRAWINGS

FIGS. 3A-3E are a simplified flowchart illustrating a method of determining a gravity vector using movement data according to an embodiment of the present invention.

FIGS. 13A-13B are an example list of driving features that are used by some embodiments of the present invention.

Figure 1:
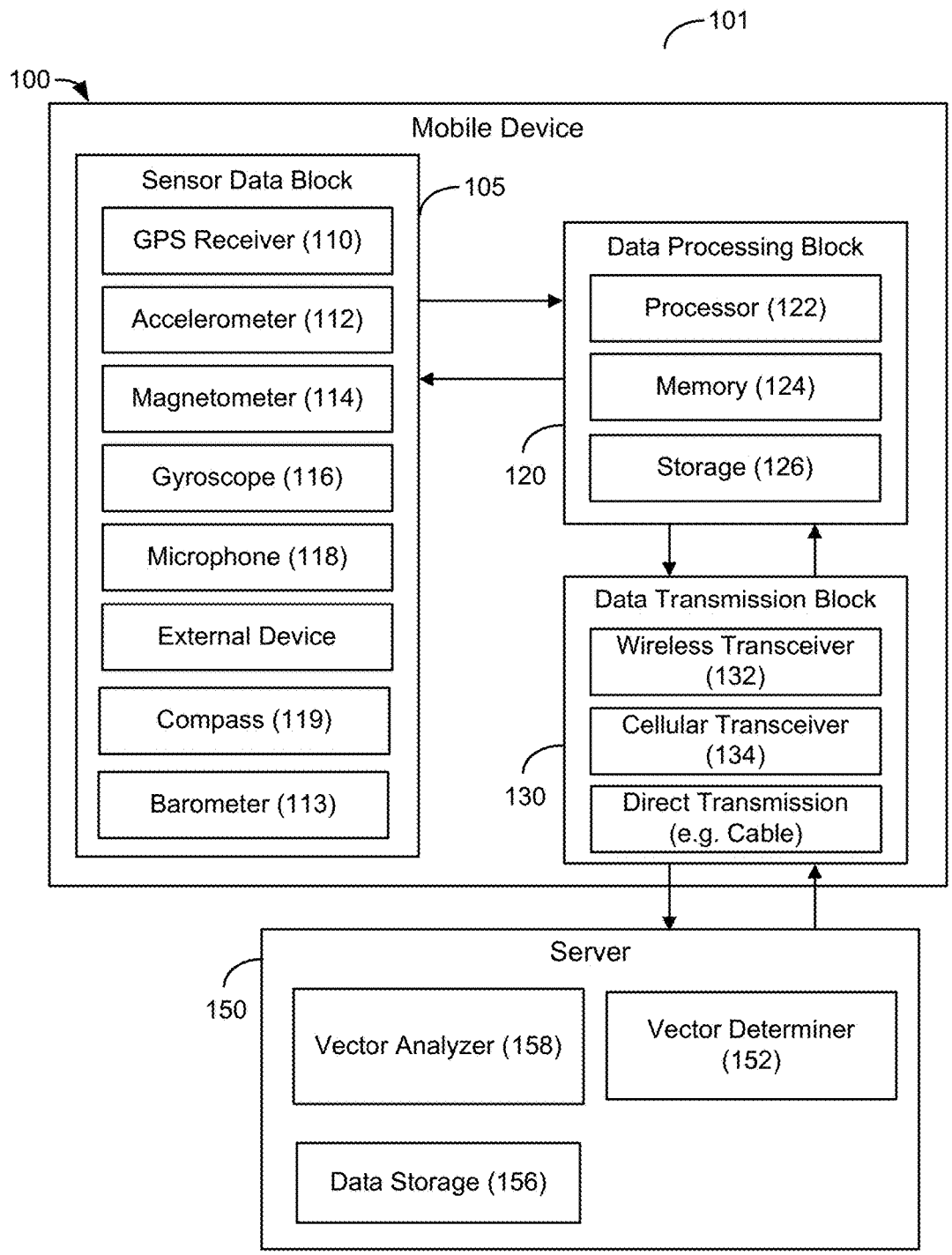
FIG. 1 is a simplified system diagram illustrating a system for collecting driving data according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Embodiments of the present invention utilize mobile devices to provide information on a user's behaviors during transportation. For example, a mobile device carried by a user could be used to analyze driving habits, which is of interest for insurance coverage and the like. As would be appreciated by one having skill in the relevant art(s), given the description herein, a mobile device can be configured to measure driving behaviors using sensors such as the GPS receiver, accelerometer, and gyroscope. While the device remains stable in a moving vehicle, these sensors can collect data that reliably represents vehicle movement.

When a mobile device is moved in the vehicle as data is being collected, the sensors may collect data that is not representative of vehicle movement. It would be helpful to improve accuracy by minimizing the effects of this additional movement without user (e.g., driver) involvement. One approach to doing this, described herein, involves collecting movement data from the mobile device sensors, and then later reviewing the data and identifying the portions of the collected sensor data where the mobile device was moving inside the vehicle. These identified portions can be removed or otherwise modified to mitigate their contribution.

In order to determine if the mobile device has been moved, determined gravity vectors can be used as a reference. Gravity always points towards the earth's center. When the mobile device is stationary, the direction of gravity vector remains unchanged relative to the position of the mobile device (i.e., in the "reference frame of the mobile device"). When the orientation of the mobile device is changed, relative to the reference frame of the mobile device, the gravity vector changes relative to the mobile device. Some embodiments take the angle difference between the gravity vectors that are one second (or other predetermined period) apart in time. If the angle difference is above a certain threshold, a determination can be made that the orientation of the mobile device was changed during that time.

As an example, if a person carries a mobile device with them and enters a vehicle as a driver, some embodiments described herein can collect accelerometer, GPS and gyroscope data to measure their driving behavior as they drive. In this example, for the first part of the drive, the mobile device remains in a bag, and later in the drive, the mobile device is moved to a mount on the dashboard, where it remains until the end of the drive. Some embodiments described herein detect the movement of the device and the change in position relative to the vehicle. By analyzing the data collected by the mobile device, some embodiments can remove the portion of the data collected while the mobile device was moving from the bag to the dashboard. This removal can act to improve the accuracy of the measured driving behavior information.

FIG. 1 is a simplified system diagram illustrating a system 100 for collecting driving data according to an embodiment of the present invention. System 100 includes a mobile device 101 having a number of different components. Mobile device 101 includes a sensor data block 105, a data processing block 120, and a data transmission block 130. The sensor data block 105 includes data collection sensors as well as data collected from these sensors that are available to mobile device 101, this can include external devices connected via Bluetooth, USB cable, etc. The data processing block 120 includes storage 126, and manipulations done to the data obtained from the sensor data block 105, this includes, but is not limited to, subsampling, filtering, reformatting, etc. Data transmission block 130 includes any transmission of the data off the mobile device to an external computing device that can also store and manipulate the data obtained from sensor data block 105.

Embodiments of the present invention discuss a system for collecting driving data using a mobile device, and embodiments of the present invention are not limited to any particular mobile device. As examples, a variety of mobile devices including sensors such as accelerometer 112, gyroscope 116, compass 119, barometer 113, location determination systems such as GPS receiver 110, communications capabilities, and the like are included within the scope of the invention. Example mobile devices include smart watches, fitness monitors, Bluetooth headsets, tablets, laptop computers, movement analysis devices, and other suitable devices. One of ordinary skill in the art would recognize many variations, modifications, and alternatives.

The system for collecting driving data also can include a server 150 that communicates with the mobile device 101. The server 150 provides functionality including vector analyzer 158, and vector determiner 158, discussed with reference to FIGS. 2-3 below. These components are executed by processors (not shown) in conjunction with memory (not shown). Server 150 also includes data storage 156. It is important to note that, while not shown, one or more of the components shown operating using server 150 can operate using mobile device 150.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive." With many mobile devices 101, the sensors used to collect data are components of the mobile device 101, and use power resources available to mobile device 101 components, e.g., mobile device battery power and/or a data source external to mobile device 101.

Figure 2:
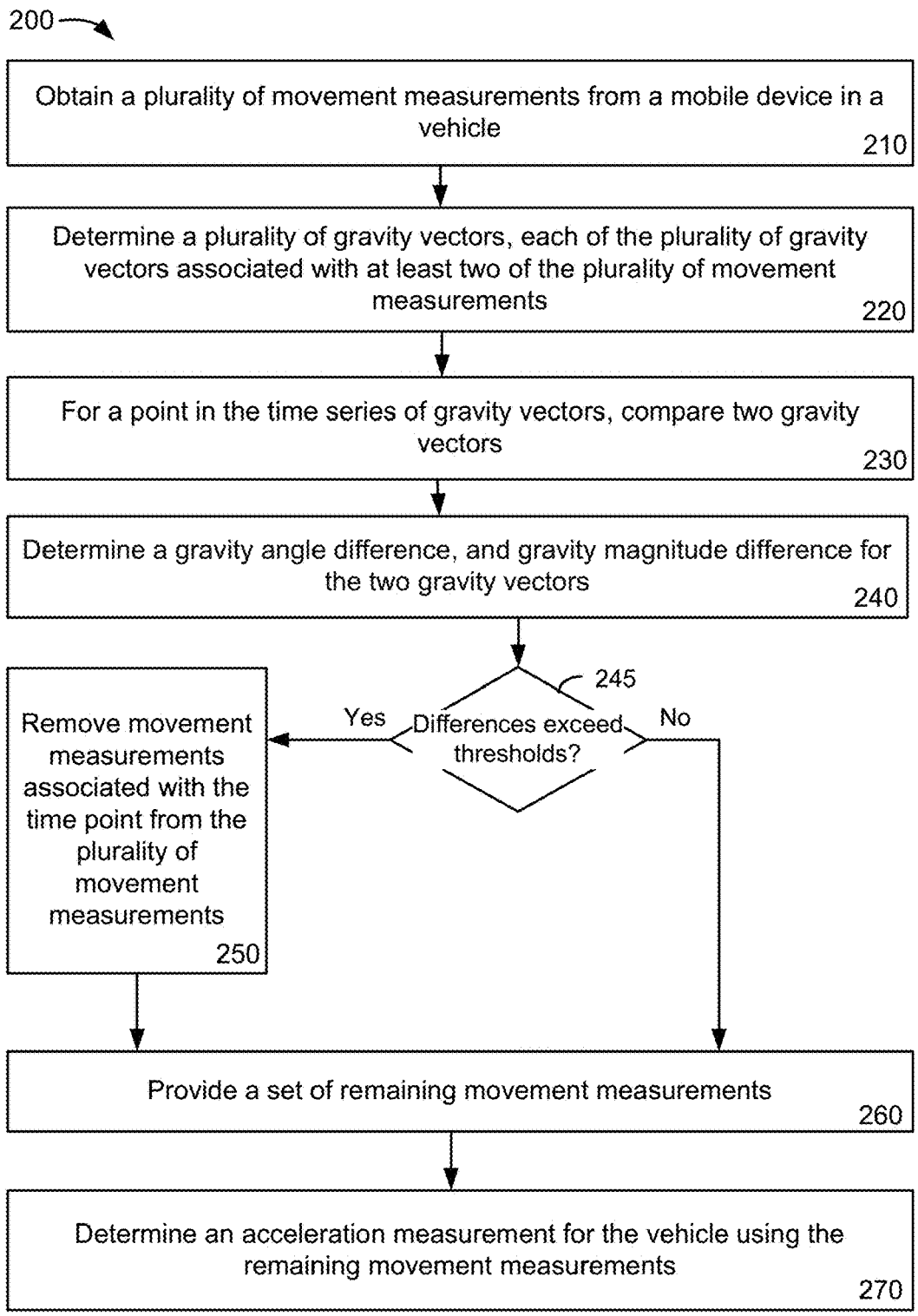
FIG. 2 is a simplified flowchart illustrating a method of collecting driving data using a driving model according to an embodiment of the present invention.

FIG. 2 is a simplified flowchart illustrating a method of collecting driving data using a driving model according to an embodiment of the present invention. The method illustrated in FIG. 2 initially collects data from mobile device sensors in a mobile device while a vehicle engages in a drive. The method includes obtaining a plurality of movement measurements from a mobile device in a vehicle (210).

The movement measurements can be obtained, for example, using sensor data block 105 in mobile device 101, e.g., a smart phone or other suitable mobile device. The collected data can include location data (e.g., GPS receiver 110 data) as a function of time, accelerometer 112 data, gyroscope 116 data, combinations thereof, or the like. In some embodiments, in order to prolong battery life, only location/GPS data is utilized, whereas in other embodiments, the location data is supplemented with accelerometer data. One of ordinary skill in the relevant art(s) would recognize many variations, modifications, and alternatives for collecting movement information for embodiments.

Once movement measurements are collected, the method determines a plurality of gravity vectors, each of the plurality of gravity vectors associated with at least two of the plurality of movement measurements (212). Referring back to FIG. 1, these gravity vectors can be created by vector determiner 152 using the collected movement measurements.

In some embodiments, a gravity vector is determined based on a comparison of one or more movement measurements from the accelerometer of the mobile device with one or more movement measurements from the gyroscope 116 of the mobile device. Gyroscope 116 can generate a data set that measures angular velocity of the mobile device, and this can provide data associated with how the mobile device is being rotated.

Accelerometer 112 can generate a data set that measures the external forces that are being applied on the mobile device (also termed "accelerations"), but the acceleration measured is a center of mass acceleration, because the sensor does not generally measure any rotations of the mobile device. As would be appreciated by one having skill in the relevant art(s), given the description herein, by using these two data sets, a gravity vector relative to the mobile device as a function of time G(t) can be determined 220. Different approaches used by embodiments for determining a gravity vector based on sensor data are discussed below with FIGS. 3A-3E.

Generally speaking, in a moving vehicle, the determined gravity vector of the mobile device as a function of time is always changing. Some embodiments continue by analyzing two gravity vectors associated with a time point (t), for example, gravity vectors G(t) before and after the time point (e.g., at t−15 seconds and t+15 seconds). By comparing these gravity vectors over a time interval, a difference in gravity angle (e.g., measured in radians), and gravity magnitude can be determined 240 (respectively termed herein, gravity angle difference and gravity magnitude difference). It should be appreciated that a larger or smaller interval can also be used. It is also important to note that, while embodiments described herein are described as operating on stored data (i.e., after the trip has completed, not in real time), the components, principles and approaches described herein could also operate in substantially real-time (e.g., using a t−30 and t−15 interval for example to analyze gravity vectors, or other suitable approach).

In some embodiments, whether the mobile device remained stationary within the vehicle during a time interval can be estimated by comparing the determined gravity angle difference, and the determined gravity magnitude difference to one or more thresholds (245). In an example of this threshold comparison, having a gravity angle difference above one (1) radian and a gravity magnitude difference above one (1) g indicate to an embodiment that the mobile device likely moved relative to the vehicle at time point (t). It would be appreciated by one having skill in the relevant art(s), given the description herein, that different combinations of threshold values could be used, e.g., different gravity magnitude differences, different gravity angle differences, and/or requiring multiple consecutive differences over thresholds before a change in orientation is estimated.

In some embodiments, when the applied threshold(s) are exceeded for a time point, the movement measurements associated with the time point are removed from the plurality of movement measurements (260), and an acceleration measurement for the vehicle is determined using the remaining movement measurements.

It should be appreciated that the specific steps illustrated in FIG. 2 provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3B:
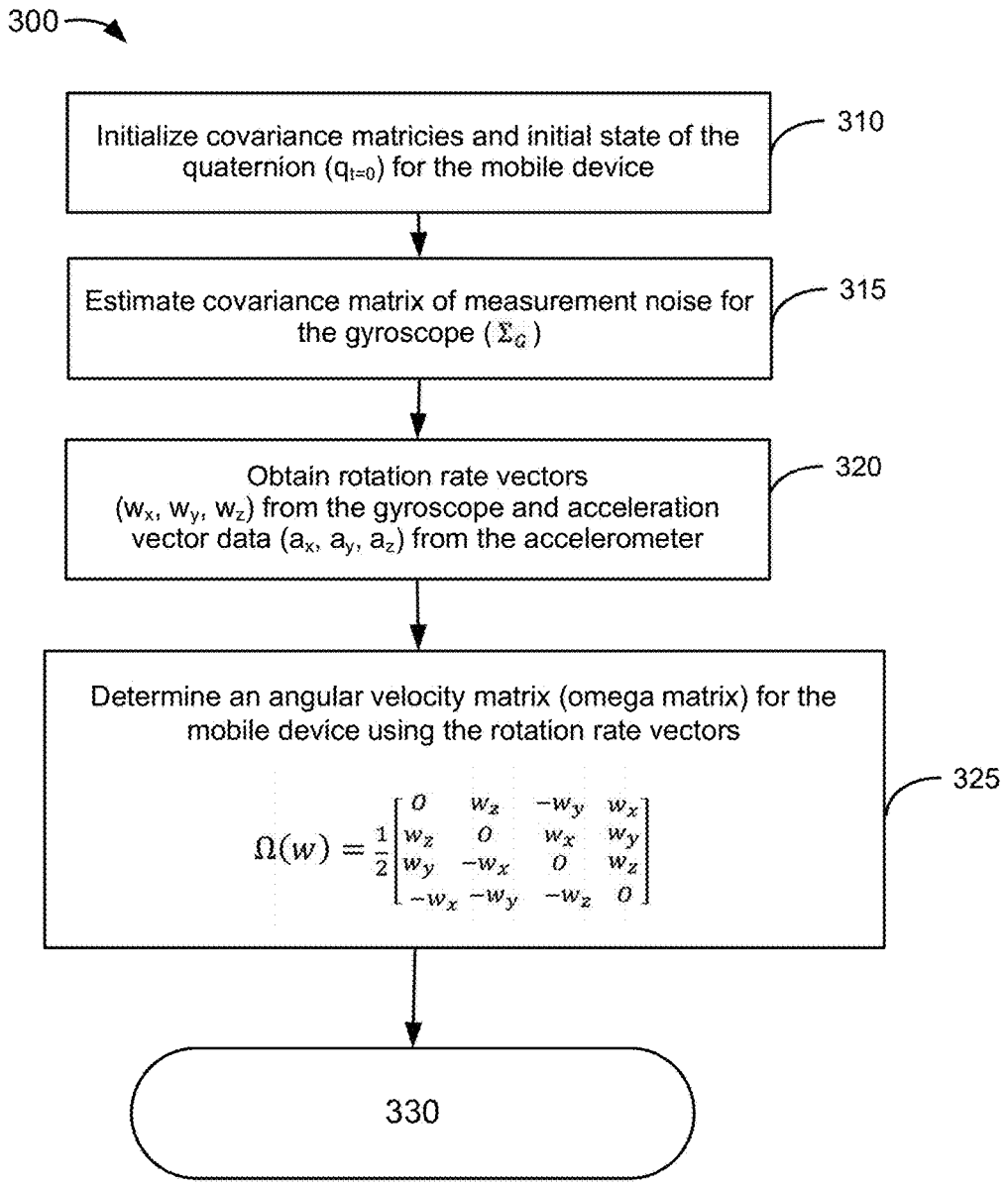
Figure 3C:
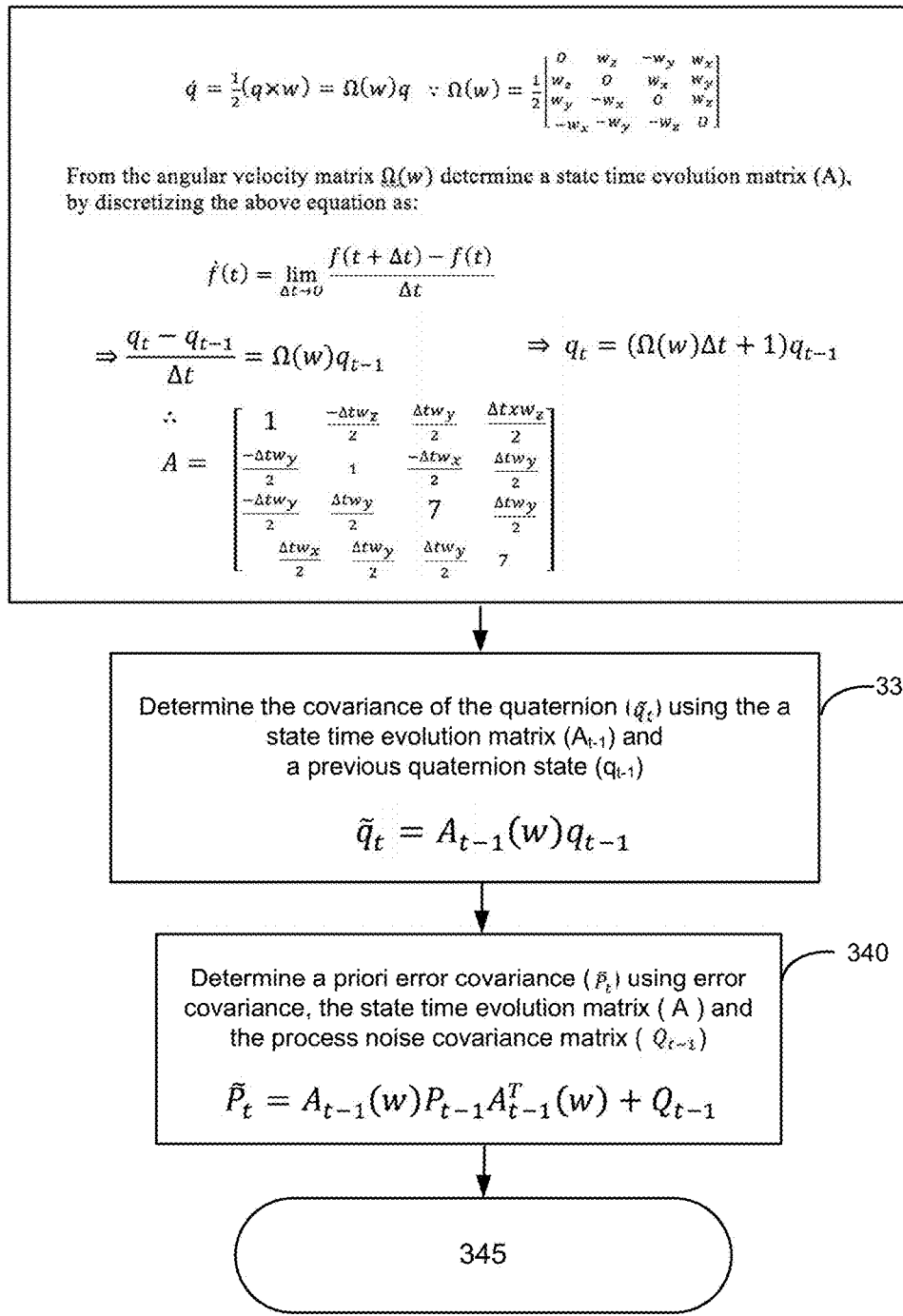
Figure 3D:
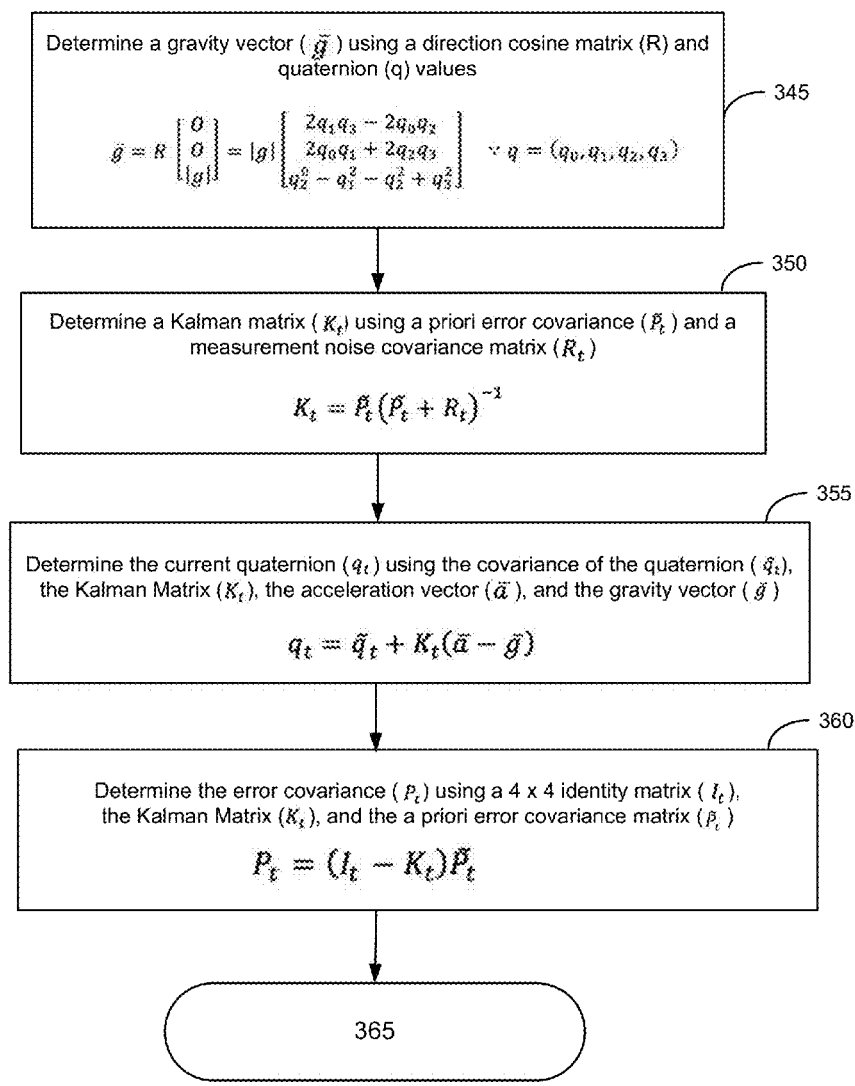

FIGS. 3A-3E are a simplified flowchart illustrating a method 300 of using a variation of an extended Kalman filter to determine a gravity vector for the mobile device using movement data from mobile device sensors. One having skill in the relevant art(s), given the description herein, will appreciate how to use other variations of a Kalman filter and/or other approaches to determine gravity vectors by embodiments described herein. FIG. 3A lists variables used in the method flowchart of FIGS. 3B-3E. It should be understood that other terms can be used for the variables discussed, and additional or fewer variables may be used by some embodiments.

The method illustrated in FIGS. 3A-3E initially initializes values that may be used in later stages of the method. For example, some embodiments of the method utilize covariance matrices and a quaternion value that are initialized (310) and used in a first instance of the method, then updated based on determined results. One having skill in the relevant art(s), given the description herein, would appreciate that the initial values can be selected using different known approaches. Also, in some embodiments, an estimated covariance matrix of measurement noise for the gyroscope (315) can be defined, this matrix remaining static for the operation of the method. This estimate can be determined by empirical testing, e.g., assessing measurement noise for individual devices, a model of device, or any other similar approach.

Next, rotation rate vectors are obtained from the gyroscope and acceleration vector data are obtained from the accelerometer (320). From this data, an angular velocity matrix is determined for the mobile device (325), and this is used along with quaternion, rotation rate and acceleration vector data to determine a state time evolution matrix (330). This state time evolution matrix can be used to determine the covariance of the quaternion using the current quaternion value for the mobile device and a process noise covariance matrix (335). An a priori error covariance is determined using an error covariance, the state time evolution matrix and a process noise covariance matrix (340). As noted above, these covariance matrices may have been initialized for the first instance of these determinations.

Using the current quaternion value, a gravity vector is determined using a cosine matrix (345), the quaternion value, in some embodiments, first having an initial value, then having a value updated for each instance of the method. Next a modified extended Kalman matrix is determined using the a priori error covariance and a measurement noise covariance matrix (350). Next, the quaternion for the mobile device is updated based on the covariance of the quaternion, the Kalman matrix, acceleration vector data and the determined gravity vector (355). The error covariance matrix is updated using an identity matrix (e.g., a 4×4 matrix), the Kalman matrix and the a priori error covariance matrix (360).

Finally, the process noise covariance matrix is updated based on the current quaternion and the covariance matrix of measurement noise for the gyroscope (365). As discussed with FIG. 4 below, some embodiments analyze a series of determined gravity vectors, as generated by 345, and the method described above repeats from stage 320 until an end signal is received (370), using the updated values described above. It should be appreciated that, in some embodiments, method 300 is performed on previously collected movement measurement data (e.g., the accelerometer and gyroscope of the mobile device), and an end signal is received when the data has been processed. As would be appreciated by one having skill in the relevant art(s), given the description herein, method 300 can also be performed on movement measurement data as it is collected, and/or a combination of both approaches.

It should be appreciated that the specific steps illustrated in FIGS. 3A-3E provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIGS. 3A-3E may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
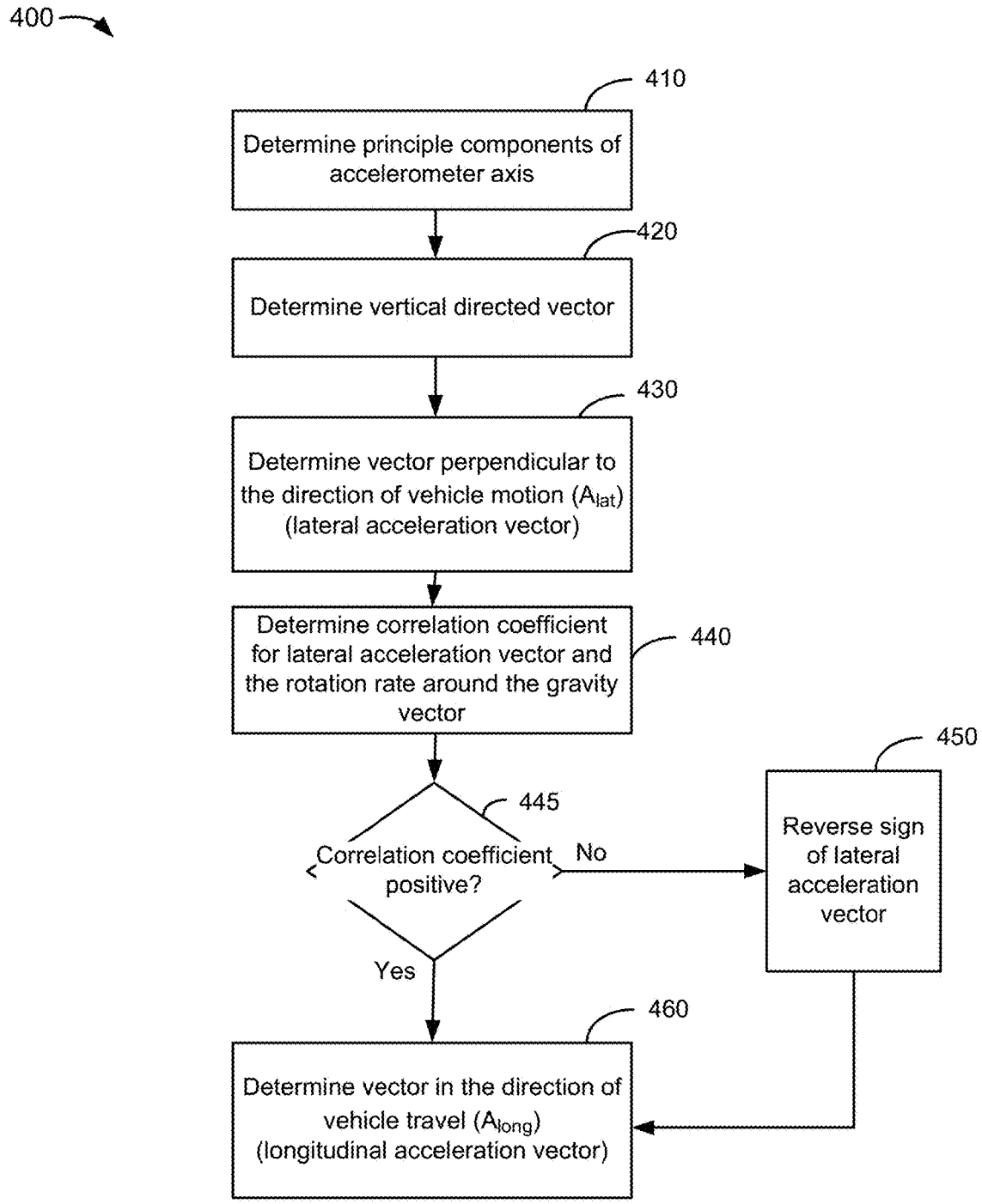
FIG. 4 is a simplified flowchart illustrating a method of collecting driving data using a driving model according to an embodiment of the present invention.

FIG. 4 shows a simplified flowchart illustrating a method 400 of collecting driving data using a driving model according to another embodiment of the present invention. The method illustrated in FIG. 4 initially receives the remaining movement measurements from the process described with FIG. 2, i.e., a plurality of movement measurements collected from a mobile device that was estimated to be stationary relative to a vehicle when the measurements were collected. In some embodiments, the process described with FIG. 4 can analyze these collected samples, and determine a measurement for acceleration in the direction that the vehicle is traveling. One having skill in the relevant art(s), given the description herein, will appreciate that the approaches described with FIG. 4 can also be used to determine other measurements.

Having received the movement measurements from the processes of FIG. 2, principle component analysis (PCA) is used to identify three different components of the movement measurements collected the accelerometer for a time interval (410). These components are: acceleration in the direction of travel of the vehicle ($A_{long}$, longitudinal or horizontal acceleration), acceleration perpendicular to the direction of travel of the vehicle ($A_{lat}$, turning, lateral or transversal acceleration), and the "up and down" acceleration ($A_{vert}$, vertical acceleration or the "vertical directed vector"). Three component values are identified at this stage, but the specific components are not known. One approach used by some embodiments to identify the three unknown values of the components of the movement measurements is described with FIG. 5 below.

In some embodiments, the vertical directed vector is identified 420 from the three component values by selecting the component that is most highly correlated with the acceleration projected onto the gravity vector for the time interval. This gravity vector can be determined based on the method described above with FIG. 3.

Next, the lateral acceleration is selected from the two remaining unknown components by identifying the component value that is most highly correlated with the rotation rate around the gravity vector (430). After this component is selected, a correlation coefficient for the lateral acceleration component as compared to the rotation rate around the gravity vector, as determined (440). In an embodiment, the sign of the determined coefficient is checked (445), and when the sign is negative, the sign of the lateral acceleration component is reversed (450), and when positive, the sign remains the same.

Figure 6A:
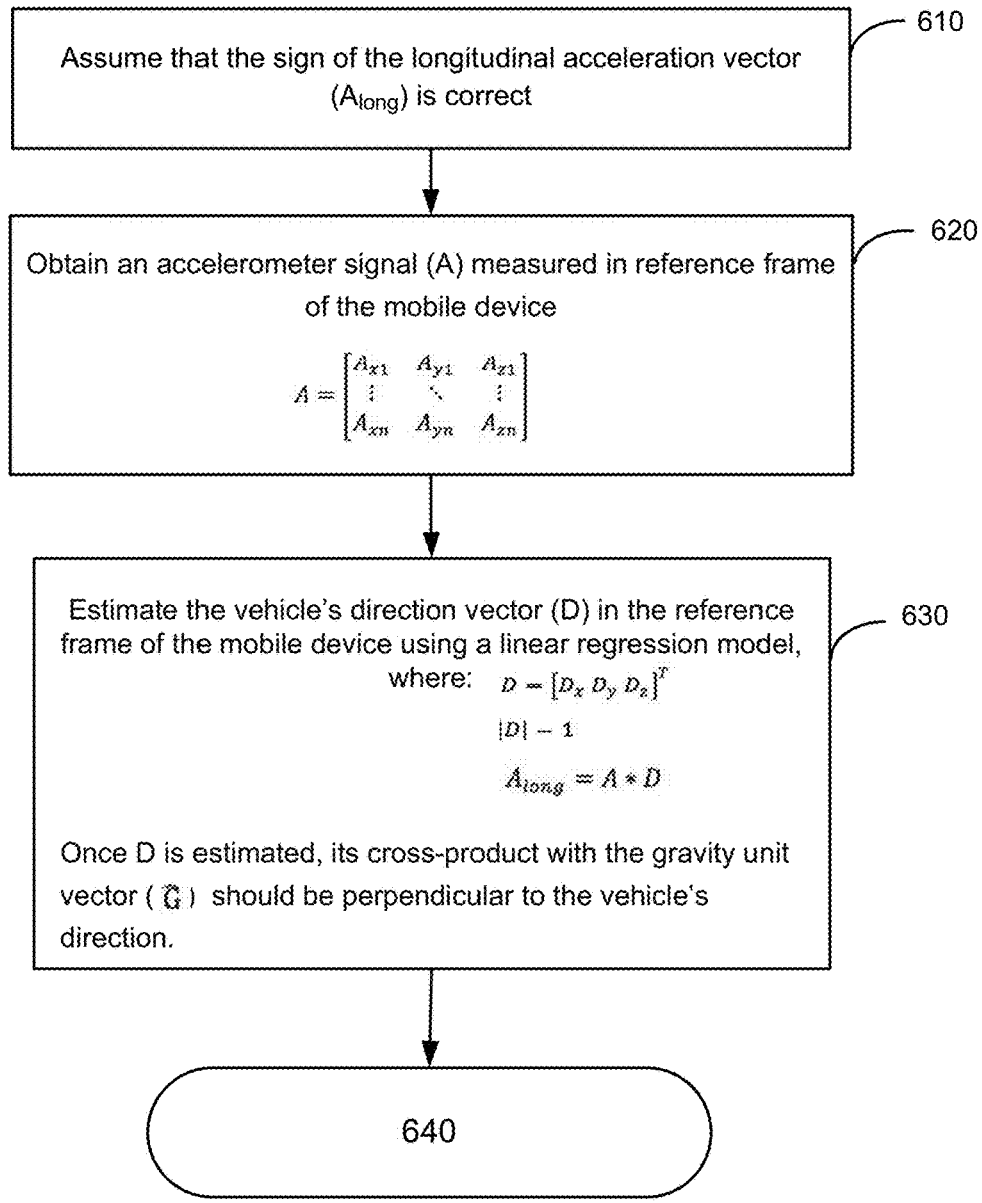
FIGS. 6A-6B is a simplified flowchart illustrating a method of determining the sign of the longitudinal acceleration component according to an embodiment of the present invention.
Figure 6B:
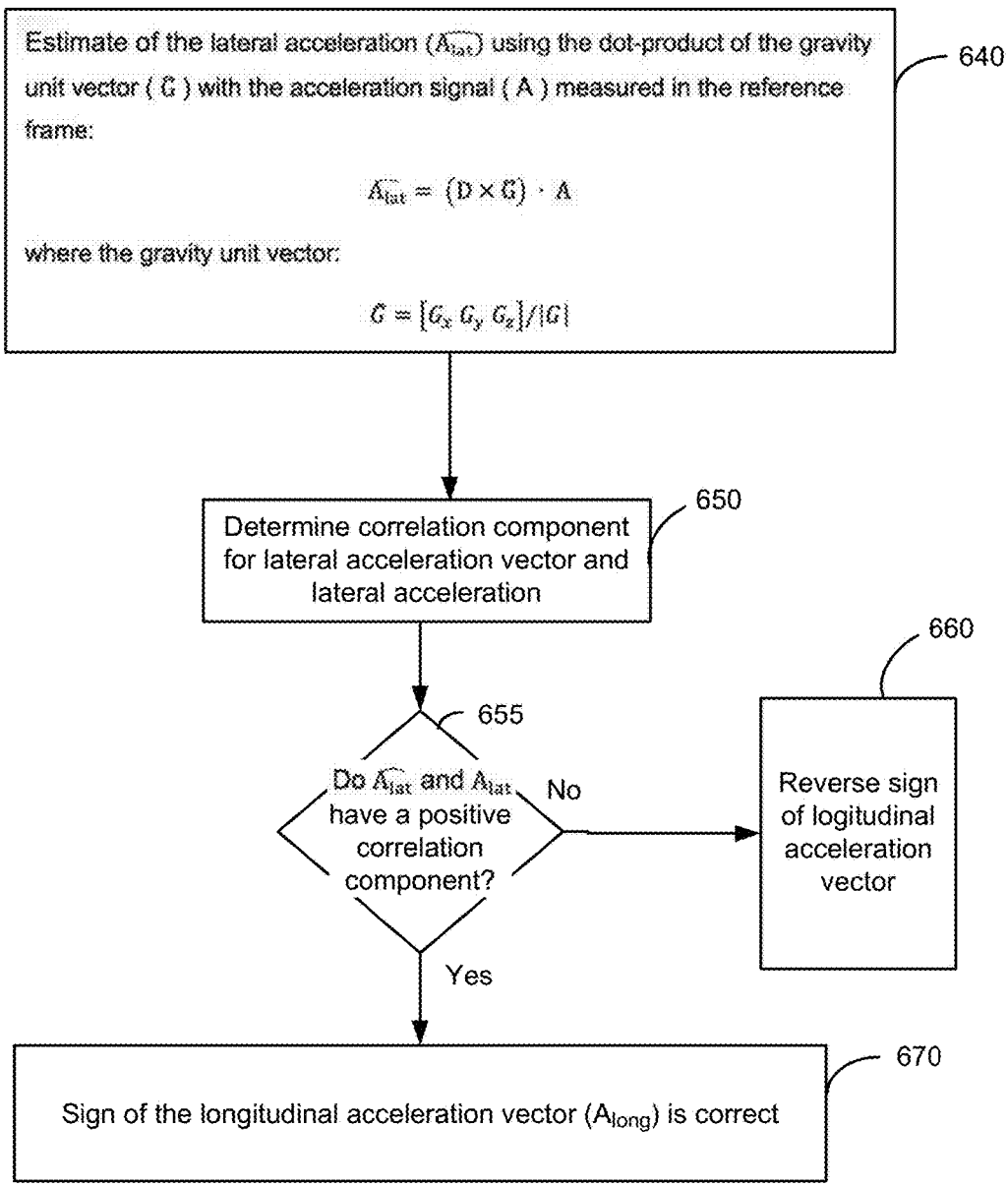

The remaining component is identified as the longitudinal acceleration component (460). In some embodiments, the process described with FIGS. 6A-6B is used to determine the sign of this component.

It should be appreciated that the specific steps illustrated in FIG. 4 provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
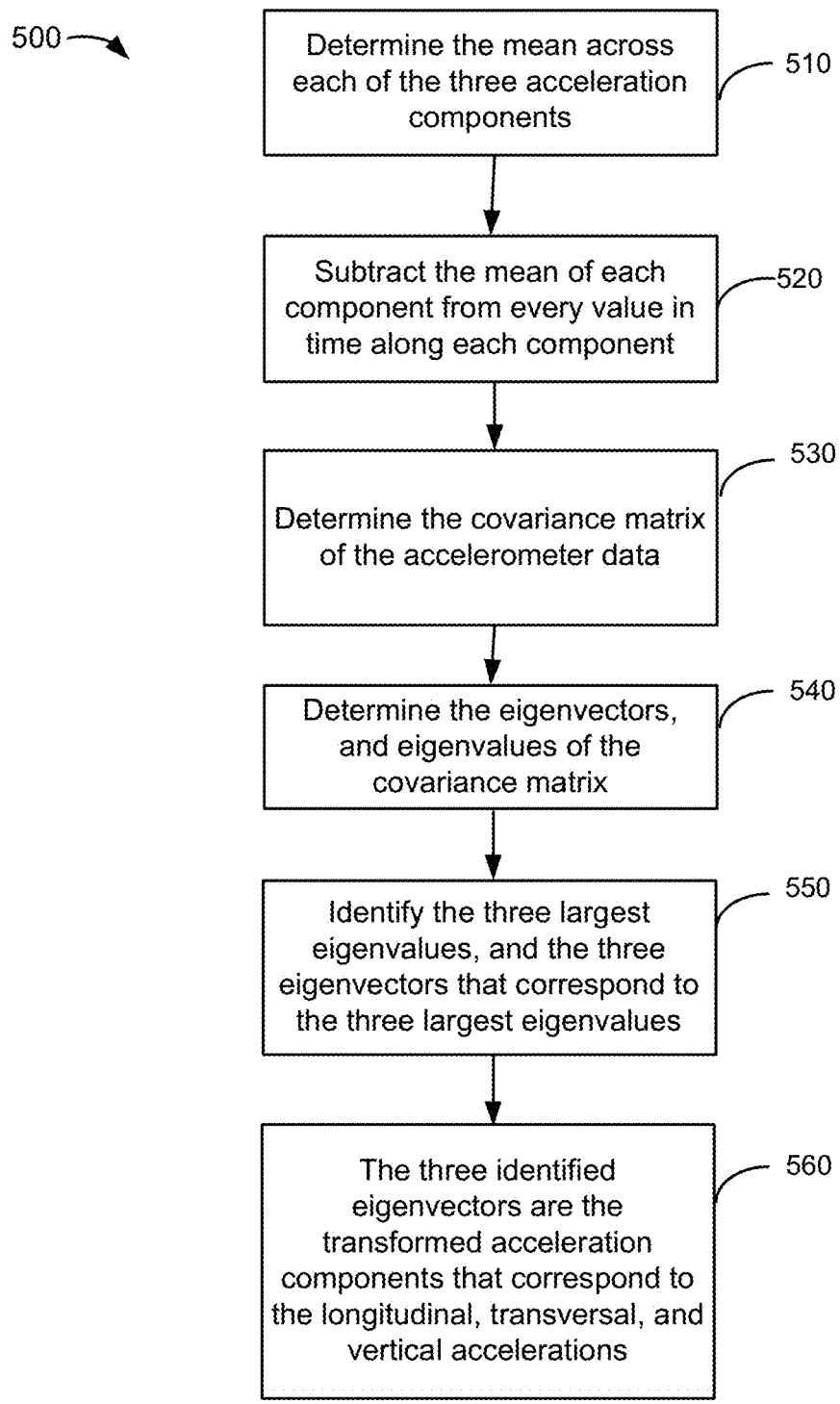
FIG. 5 is a simplified flowchart illustrating a method of using principle component analysis (PCA) to identify different components of the movement measurements collected according to an embodiment of the present invention.

FIG. 5 is a simplified flowchart illustrating an approach used by some embodiments, to identify by PCA, the three different components of the movement measurements collected the accelerometer for a time interval (500). Next, the mean across each of the three acceleration components is determined (510), and the mean of each component is subtracted from every value in time along each component (520).

Next a covariance matrix of the accelerometer data is determined (530), along with the eigenvectors, and the eigenvalues of the covariance matrix (540). In an example embodiment, the accelerometer data is three-dimensional, and the covariance matrix is a 3×3 matrix. The three largest eigenvalues are identified (540), as well as the three eigenvectors that correspond to the three largest eigenvalues (550). The three identified eigenvectors are the transformed acceleration components that correspond to the longitudinal, transversal, and vertical accelerations (560).

It should be appreciated that the specific steps illustrated in FIG. 5 provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 6A and 6B show a simplified flowchart illustrating a method of determining the sign of the longitudinal acceleration component according to an embodiment of the present invention. The method illustrated in FIGS. 6A-6B begins with an assumption that the sign of the longitudinal component as determined, for example, in the process described with FIG. 5, is correct (610). Next, an accelerometer signal is obtained measured in the mobile device (620). Using this accelerometer signal and the assumed longitudinal acceleration value, the direction vector of the movement of the vehicle in the reference frame of the mobile device is determined (630).

Next, a lateral acceleration vector is estimated using the dot-product of the gravity unit vector and the accelerometer signal (640). This estimated lateral acceleration vector is correlated with the lateral acceleration component determined with the process described with FIG. 5 (650). If this correlation is negative, the sign of the longitudinal acceleration vector is reversed (660), and if the correlation is positive, the current sign is correct (670).

It should be appreciated that the specific steps illustrated in FIGS. 6A-6B provide a particular method of determining the sign of the longitudinal acceleration component according to an embodiment of the present invention. Other sequences of steps may also be performed according to alternative embodiments. For example, alternative embodiments of the present invention may perform the steps outlined above in a different order. Moreover, the individual steps illustrated in FIGS. 6A-6B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
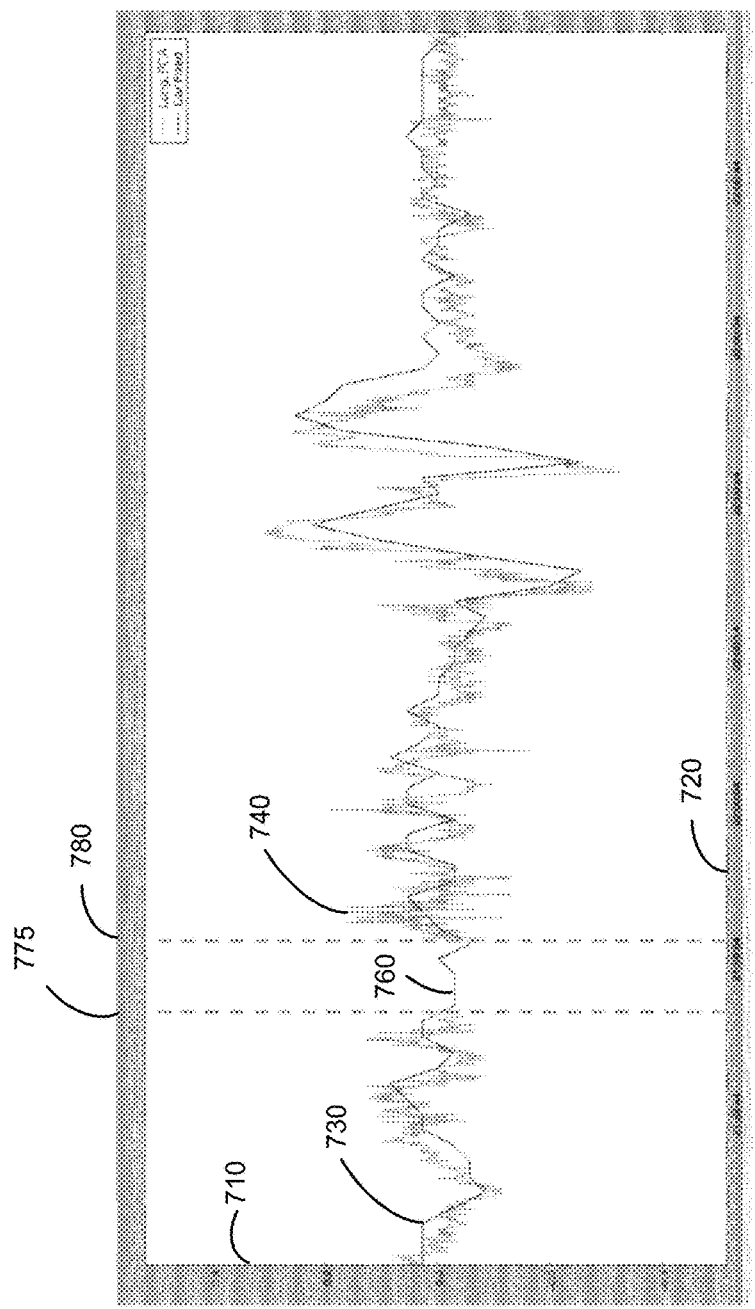
FIG. 7 is a simplified plot illustrating vehicle acceleration measured by an embodiment herein, as compared to acceleration measured by a derivative of the on-board diagnostics (OBD) speed measurements.

FIG. 7 is a simplified plot illustrating vehicle acceleration measured by a mobile device using an embodiment of the movement-detection approaches described herein (740), as compared to acceleration measured by a derivative of the OBD speed measurements (730). The OBD speed derivative (730) is not subject to the movement effects described as affecting the mobile device, e.g., moving in relation to the vehicle. The value of acceleration (710) is shown on the Y-Axis and time (720) is shown on the X-Axis.

As shown on FIG. 7, the interval marked between 775 and 780 is a period of time where the mobile device was determined by an embodiment to have been moved in relation to the vehicle. It should be noted that, for other intervals shown, there is a rough correlation between OBD (730) and acceleration determined by an embodiment (740). During these intervals, while the mobile device is not moving in relation to the vehicle, the acceleration measurements of OBD 740 and mobile device measurements 730 are generally the same.

During the interval between 775 and 780, only the OBD measurements 760 are shown. In this example, because the mobile device was determined to have been moved during this interval, the mobile device measurements 740 were removed from the data set, and not analyzed for indications of driving behavior. If these values had been left in the data set, the acceleration measurements could be substantially different, and, if used to determine vehicle acceleration, these deviations could cause errors in the determined values. In some embodiments, an approach can be used to estimate values for the data omitted during the time period from 775 to 780.

It is important to note that, at time point 780, when the mobile device was determined to have stopped moving in relation to the vehicle, the mobile device need not have been replaced to the same location and/or orientation within the vehicle. Some embodiments are able to align the mobile device to the vehicle and reflect a new orientation within the vehicle.

It should be appreciated that the specific plot illustrated in FIG. 7 provides a particular example of movement data collected and/or generated by an embodiment as compared to data collected by different approaches. In other embodiments, different approaches can be used to handle the movement of the mobile device during the collection of movement measurements. One of ordinary skill in the art would recognize many variations, modifications, and alternatives.

Figure 8:
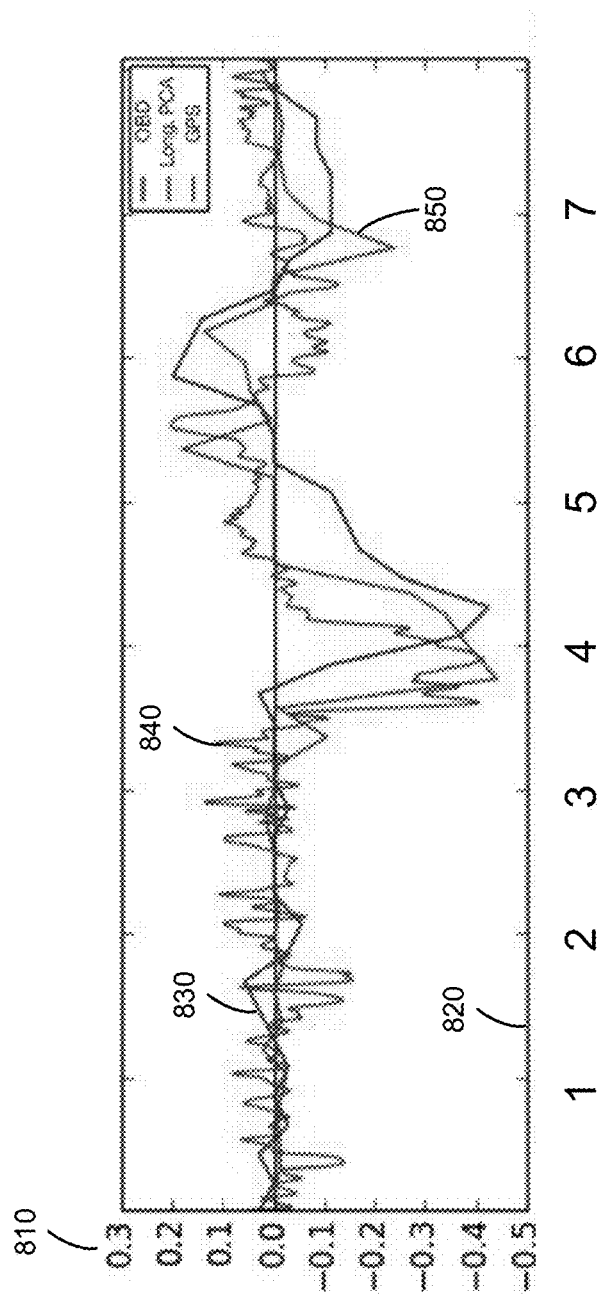
FIG. 8 is a simplified plot illustrating longitudinal vehicle acceleration measured by an embodiment of the present invention as compared to acceleration estimated based on GPS receiver and on-board diagnostics (OBD) measurements.

FIG. 8 is a simplified plot illustrating the longitudinal component of vehicle acceleration determined by an embodiment described herein (840), as compared to longitudinal acceleration measured by a derivative of the OBD speed measurements (830). Also shown on FIG. 8 is longitudinal acceleration measured by a derivative of a GPS speed measurement for the vehicle. The value of acceleration (810) is shown on the Y-Axis and time (820) is shown on the X-Axis.

As noted above with the description of FIG. 4, the longitudinal acceleration, as shown on FIG. 8, is acceleration determined to be in the direction of travel of the vehicle by an embodiment. As would be appreciated by one having skill in the relevant art, given the description herein, the three plotted acceleration values, GPS 850, OBD 830 and longitudinal 840 have similar plotted values.

Figure 9:
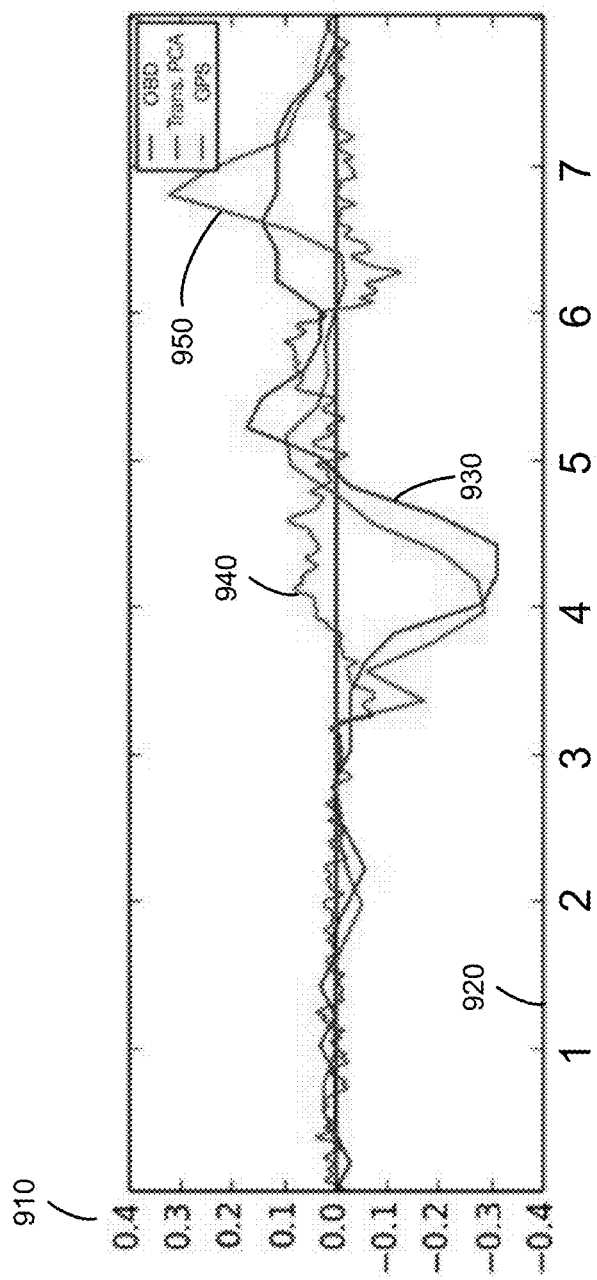
FIG. 9 is a simplified plot illustrating transverse vehicle acceleration measured by an embodiment described herein, as compared to acceleration estimated based on GPS receiver and OBD measurements.

FIG. 9 is a simplified plot illustrating the transverse component of vehicle acceleration determined by an embodiment described herein (940), as compared to transverse acceleration measured by a derivative of the OBD speed measurements (930). Also shown on FIG. 9 is transverse acceleration determined by a derivative of a GPS speed measurement for the vehicle. The value of acceleration (910) is shown on the Y-Axis and time (920) is shown on the X-Axis.

As noted above with the description of FIG. 4, the transverse acceleration, as shown on FIG. 9, is acceleration determined to be in the direction lateral to the direction of travel of the vehicle by an embodiment. As would be appreciated by one having skill in the relevant art, given the description herein, the three plotted acceleration values, GPS 950, OBD 930 and longitudinal 940 have similar plotted values.

Figure 10:
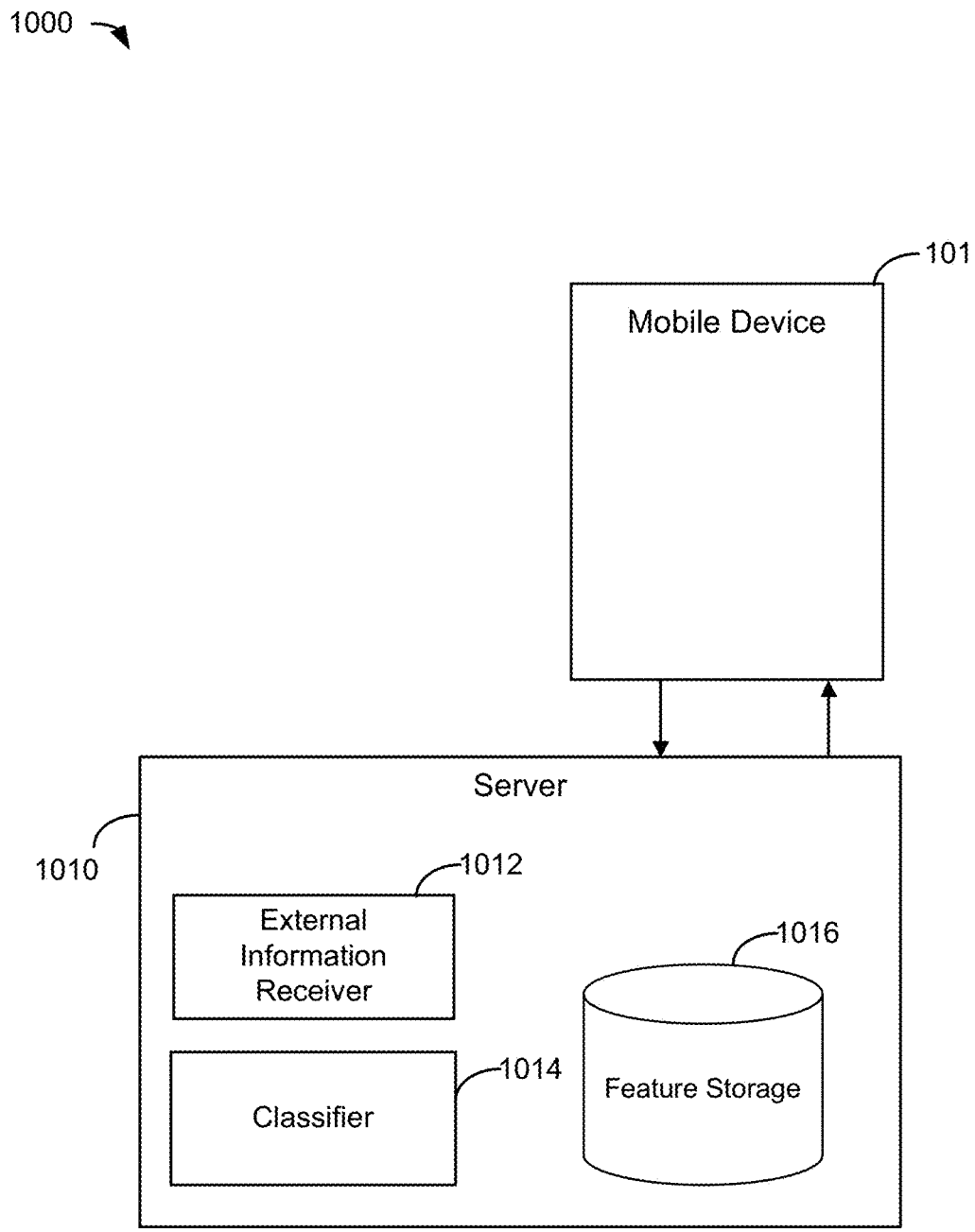
FIG. 10 is a is a simplified system diagram illustrating a system 1000 for pattern-based identification of the driver of a vehicle according to an embodiment of the present invention.

FIG. 10 is a is a simplified system diagram illustrating a system 1000 for pattern-based identification of the driver of a vehicle, according to an embodiment of the present invention. System 1000 includes mobile device 101 described with FIG. 1, and server 1010 that communicates with mobile device 101. Server 1000 includes external information receiver 1012, classifier 1014, and feature storage 1016. Some embodiments of the present invention can determine the identity of the driver of a vehicle using movement information gathered with one or more mobile device sensors, e.g., sensors of sensor data block 105.

Classifier 1014 is a system component that can analyze movement information received by mobile device 101 sensors and identify driving features of a driver during a trip. As discussed below with FIGS. 11 and 12, in addition to analyzing movement information, classifier 1014 can analyze external information (e.g., retrieved by external information receiver 1012) associated with the trip (e.g., traffic conditions, weather, road maps). As described with FIG. 11, in some embodiments, a feature representation can be created (e.g., a collection of one or more features) over a particular trip and classifier 1014 is applied to determine whether the feature representation matches a stored identification model associated with a driver.

It is important to note that the placement of server components (e.g., external information receiver, classifier 1014, and feature storage 1016) at server 1010 is only one example of the architecture that can be used to implement some embodiments. Different functions performed by servers described herein could be performed by mobile device 101, or be distributed across multiple systems.

Figure 11:
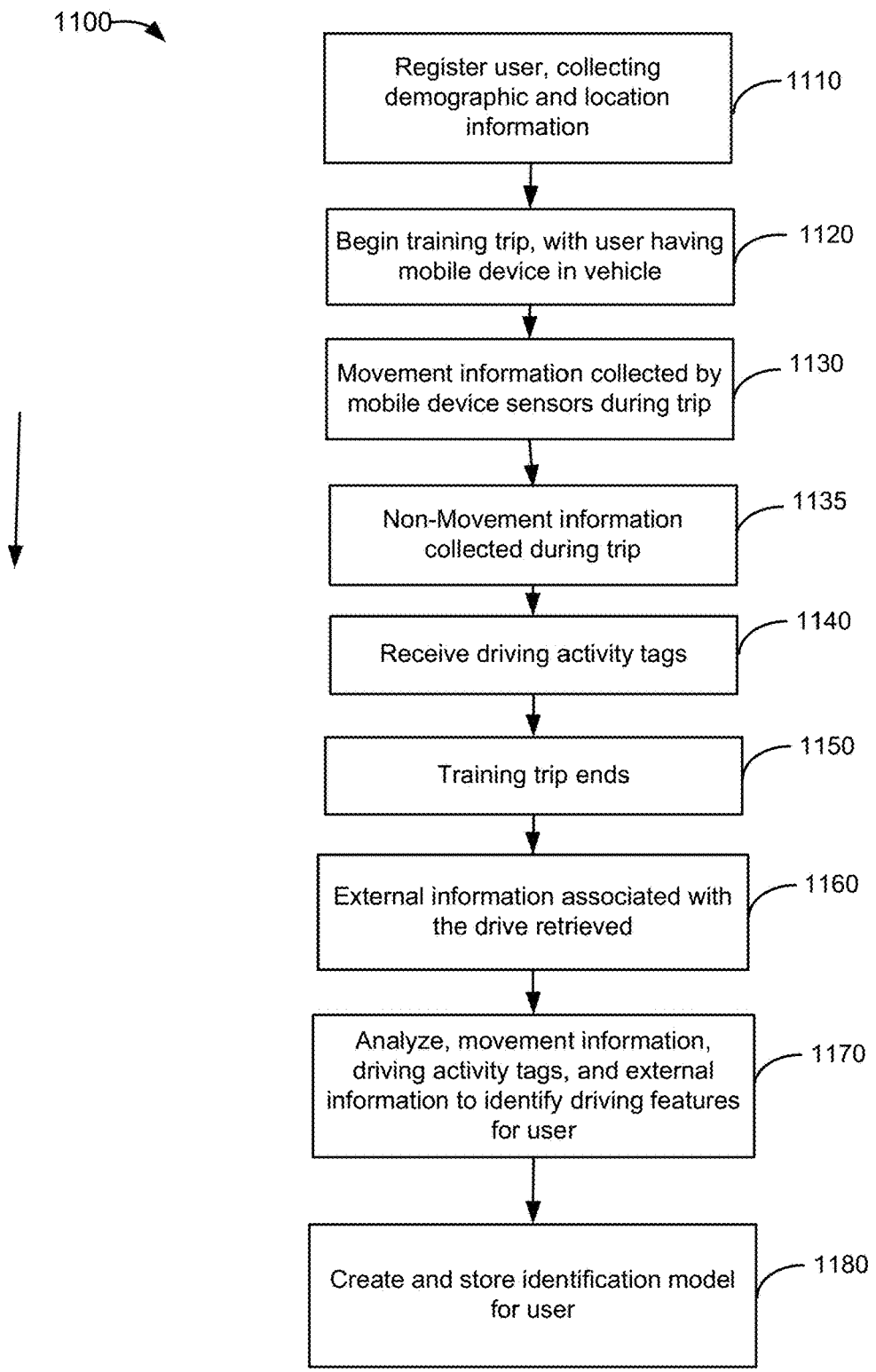
FIG. 11 is a simplified flowchart illustrating a method of training a driver-identification classifier using a mobile device according to an embodiment of the present invention.

FIG. 11 is a simplified flowchart illustrating a method of training a driver-identification classifier using a mobile device (1100). The method begins with a user (e.g., a user having a mobile device) being registered, and components (e.g., classifier 1014) collecting demographic and location information (1110) from the user. In some embodiments, this information can provide additional points of analysis for classifier 1014 to identify the registered user. For example, when a trip begins from a location identified by a user to be their home, this is a contextual feature that has a high likelihood of identifying a driver, and can be used by he processes described below. When time of day is also considered (e.g., in the morning or afternoon), the likelihood can be even higher. Demographic information can provide additional points of analysis to link a known driver with a collection of measured driving behaviors (features). A driver's age may be determined to be likely to cause different driving behaviors (e.g., higher speed, faster cornering).

Once a user has been registered with the system, a training trip begins, with the user driving and having mobile device in vehicle (1120). In some embodiments, the "trip" is an interval of travel for assessing driving behavior. In this classifier 1014 training phase example, a trip is used as a starting and ending point for gathering, assessing and storing driving features for a driver. In different embodiments, different intervals of travel could be used. Internally, some embodiments, while using the trip as an interval of measurement, assess driving behavior at smaller intervals, e.g., every two (2) miles.

It is important to note that, the registration activity (1110), as well as the training driver identifying themselves before the training trip, is optional for embodiments. Some embodiments can use known information to select a likely identity for an unknown training trip driver, e.g., a trip starting at a known start address.

In embodiments, movement information is collected by mobile device sensors (e.g., sensor data block 105) during the training trip (1130). In some embodiments, this raw sensor information can be stored in mobile device 101 for later analysis by classifier 1014 on server 1010, in some embodiments, movement information can be collected and analyzed by mobile device 101, and in some embodiments a combination of both approaches can be used. It is also important to note that, while mobile device sensors are used by some embodiments, these sensors can be supplemented by other sources of movement information, e.g., OBD data from vehicle.

In some embodiments, information can be collected for analysis that is not movement information from mobile device 101 sensors (1135). This "non-movement" information, can be closely related to driving behavior, and thus provide additional useful identifying information. For example, mobile device 101 can be configured to monitor activities on the device during the trip (e.g., phone calls, music player activities, text messages sent, and/or other activities). Mobile device 101 can also receive and collect Bluetooth activity (e.g., the use of a headset for calls). Non-movement sensors on mobile device 101 (e.g., light-sensor, microphone, barometer/altimeter, and/or other sensors) can also provide useful information to identify drivers. For example, some drivers may play music at a louder volume (as measured by the microphone), trip with windows down more frequently (e.g., a light-sensor measures more light during a daytime trip).

In addition to non-movement information gathered by mobile device 101, other linked mobile devices can provide useful information to some embodiments. For example, a smart watch, fitness tracker, and/or other similar devices, can be configured to collect information for classifier 1014 to identify a particular driver (e.g., mobile device 101 can connect to these devices by Bluetooth). Useful information provided by the smart watch can include the hand upon which the watch is being worn, this location being an indicator of the handedness of the wearer. Smart watches can also provide useful information about hand/arm movements during the trip, such information being an indicator of steering (e.g., the wearer is driving).

In some embodiments, the training of classifier 1014 can be "supervised" by data being provided to annotate, comment on, and/or "tag" movement information. This receiving of driving activity tags (1140), can be done at the time of the activity, e.g., by an interface provided by mobile device 101 (e.g., driver change during trip, weather changes during trip, mechanical problems with vehicle, and/or other similar tags).

When the training trip ends (1150), some embodiments transfer collected information to server 1010 for analysis. To provide additional combinations of correlated information, some embodiments retrieve external information (e.g., using external information receiver 1012) associated with the trip (1160). This external information (also termed "contextual" information), can provide additional information about the driver and distinctive driving behavior.

For example, road maps, weather, traffic, daylight, and/or other information can be retrieved and correlated with the movement information collected (1130) during the training trip. Certain drivers may do certain activities more frequently during the rain, for example (e.g., they drive faster, corner slower, stop more frequently, play the radio at a lower volume). Cornering speeds and forces can be correlated to the track of the road, to assess the characteristics of the driving behavior (e.g., the driver making sharp turns on relatively straight roads, and/or other similar events).

Once information has been broadly collected, from sources and by processes described above, classifier 1014 analyzes the information identify driving features for the driver of the training trip (1170). As used herein features (also termed "driving features") are the individual points by which drivers are compared. A list of example features is provided at FIGS. 14A-B. One having skill in the relevant art(s), given the description herein, will appreciate that features can be individual values, percentiles, averages, the results of formulas, and/or other similar values.

Features can be generated by embodiments as combinations of other features. A contextual combination combines features with contextual (external) information, e.g., how a person drives in the rain. Features can be sequential, e.g., for example, a driver may brake in a particular way, then accelerate in a particular way. Features can be conditional, for example, in heavy traffic, the driver may have a higher jerk value (the derivative of acceleration). Feature can be values, e.g., the amount of heading changes per sampled distance of driving (e.g., index 15 shown on FIG. 14A), or ranges of values, e.g., range of cruising speeds for highway driving.

Different embodiments balance the benefits can costs of identifying, analyzing, storing and using for identification, a number driving features having a level of complexity. As would be appreciated by one having skill in the relevant art(s), given the description herein, more driving features having higher complexity may improve the accuracy of driver identification by classifier 1014, in some embodiments, but it can also increase time and operating costs.

Figure 12:
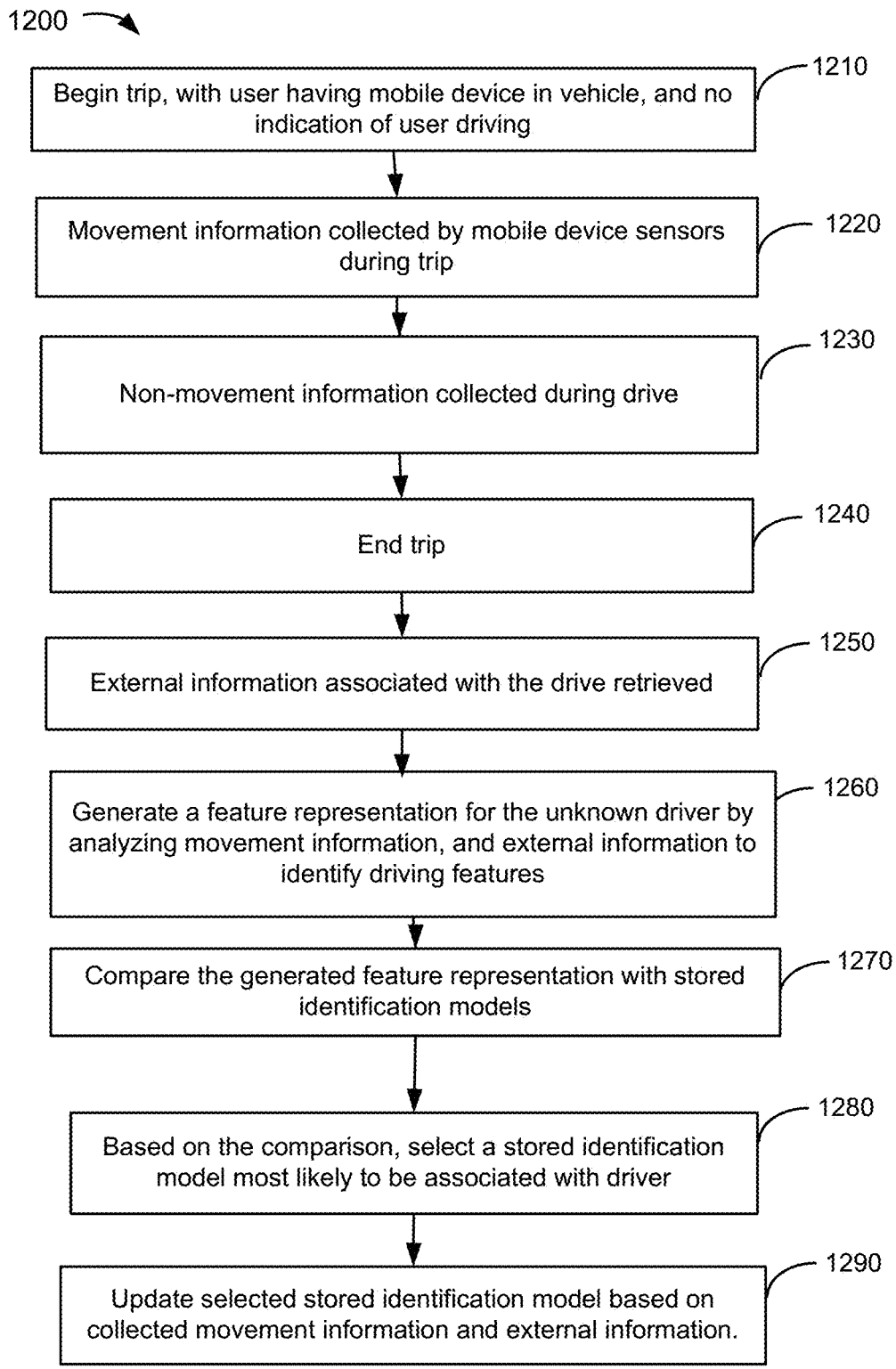
FIG. 12 is a simplified flowchart illustrating a method of identifying a driver that is driving a vehicle using collected information according to an embodiment of the present invention.

Once driving features have been identified (e.g., by classifier 1014), an identification model can be created and stored (1180). This identification model (e.g., stored in feature storage 1016), can be used to identify this driver in the future based on their driving behavior FIG. 12 is a simplified flowchart illustrating a method of identifying a driver that is driving a vehicle using collected information (1200), e.g., the identification model described with FIG. 11. The method begins with the beginning of a trip, with user having mobile device in vehicle, and no indication of user driving (1210). Some embodiments operate on mobile devices with users wanting to have driving behavior monitored for times they are driving. An example use allows the users to simply enter a vehicle for a trip, and either drive or not drive, with driving behavior only being measured for them when they are driving the vehicle (e.g., no indication that they are driving needs to be provided). In this example, an identification model has been created for the mobile device user in advance of this trip, such model being used to identify them as either driving or not driving based on the behavior collected during the drive.

While the trip continues, movement information is collected by mobile device sensors (1220). Non-movement information, described with FIG. 11 above (1135) can also be collected during the trip (1230). Though not shown on FIG. 12 or required by embodiments, driving activity tags (e.g., discussed with 1140 above) can be received during a trip (e.g., the user can identify themselves as either driving or not driving, specify information about traffic, weather, etc.). When the trip ends (1240), the collected information can be transferred to server 1010 for analysis by classifier 1014.

The analysis performed by classifier 1014 to identify driving features from the collected data is similar to the training process described with 1160 and 1170 above. For example, external information associated with the drive can be retrieved (1250), and a feature representation for the unknown driver can be generated by analyzing movement information, and external information to identify driving features (1260). The same types of features and feature combinations are identified by classifier 1014, and a feature representation of the unknown driver is generated.

In some embodiments, classifier 1014 compares the generated feature representation with stored identification models (1270), e.g., stored in feature storage 1016 on server 1010. Based on this comparison, a stored identification model can be selected that is most likely to be associated with the driver who was driving when the information was collected (1280). One having skill in the relevant art(s), given the description herein, will appreciate the techniques by which the feature representation is compared to stored identification models.

In this example, the mobile device 101 user from the training trip was driving, and their distinctive driving behavior, generated into a feature representation, was matched by classifier 1014 to the identification model stored (1180) in feature storage 1016, after their training trip discussed above with FIG. 11.

Once an identification model is selected (1280), the selected identification model can be updated based on the generated feature representation. For example, after the identification model was created, additional features may by added to the analysis by embodiments. This new data can be added to the identification model for later use. Also, the match made by classifier 1014 between the generated feature representation may have been made based on a subset of information stored in the model. In this example, the non-matching driving behavior in the feature representation can be added to the identification model as new information about the driver (1290).

For example, a driver may have a generated feature representation that matches nine our of ten features in an identification model. In this example, this match is sufficient to provide a high confidence in a match between the feature representation and the identification model. In this example, the one non-matching feature is associated with excessive acceleration. Some embodiments can update the identification model for the driver with this excessive acceleration feature, based on the premise that this is behavior that has not yet been captured, but is a part of this driver's range of behavior. In a similar fashion, some embodiments can update to remove features from an identification model for a driver, based on their infrequency over collected driving behavior.

FIGS. 13A-B are an example list of driving features that are used by some embodiments. As described with FIGS. 10-12 above, these driving features can be identified from movement information collected while a mobile device is in a vehicle.

Some embodiments described herein measure changes in the angular position of a mobile device to determine information associated with driving a vehicle. Some embodiments use, and expand upon, some approaches described in co-pending U.S. patent application Ser. No. 14/139,510, ('510 application) filed Dec. 23, 2013, the disclosure of which is hereby incorporated by reference in its entirety for all purposes.

In the '510 application, a method of determining if a mobile-device user entered from the left or right side of a vehicle. The '510 application describes that the entry-side can be a useful for determining whether the person using the mobile device is the driver of a vehicle or a passenger, and thus, whether data collected by the mobile device should be attributed to the user of the mobile device.

One approach to determining if a mobile-device user entered from the left or right side of a vehicle involves identifying the moment the mobile device user is entering the vehicle, and measuring the yaw (or roll) of the device during the entry event. If the user enters the car from the passenger's side, there is a unique counter clockwise rotation in this yaw axis due to the nature of the movement involved in entering the car. There will be a similar motion on the driver's side of the car on entry (and exit), but with a reversed sign to that of the passenger's side. A user typically turns at least 45 degrees when entering the car, so if a yaw angle change of approximately this magnitude is detected then it is possible to tell on which side of the vehicle a user entered.

Figure 14A:
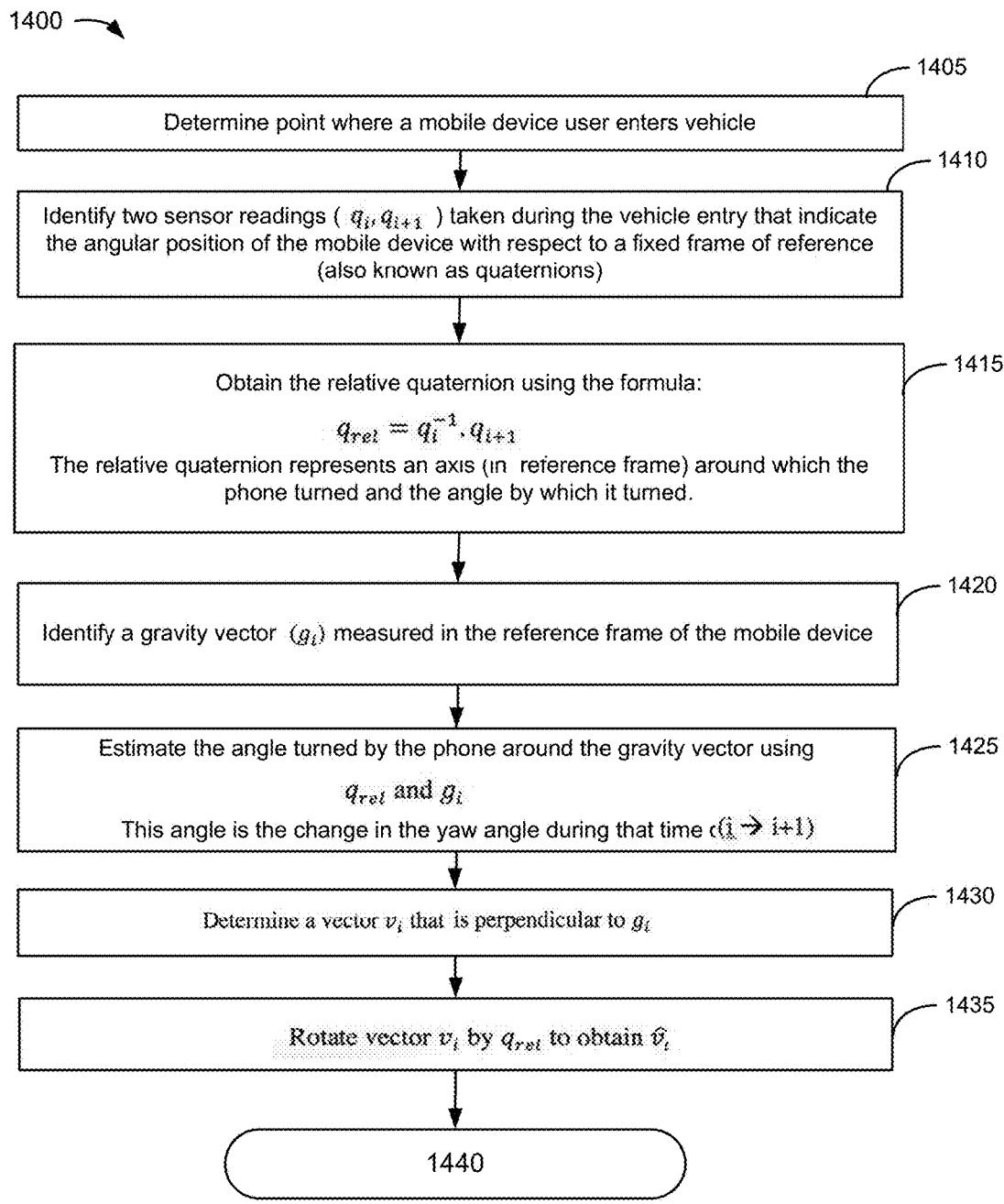
FIGS. 14A-14B are simplified flowcharts illustrating a method of determining a change in angular position associated with entering a vehicle according to an embodiment of the present invention.
Figure 14B:
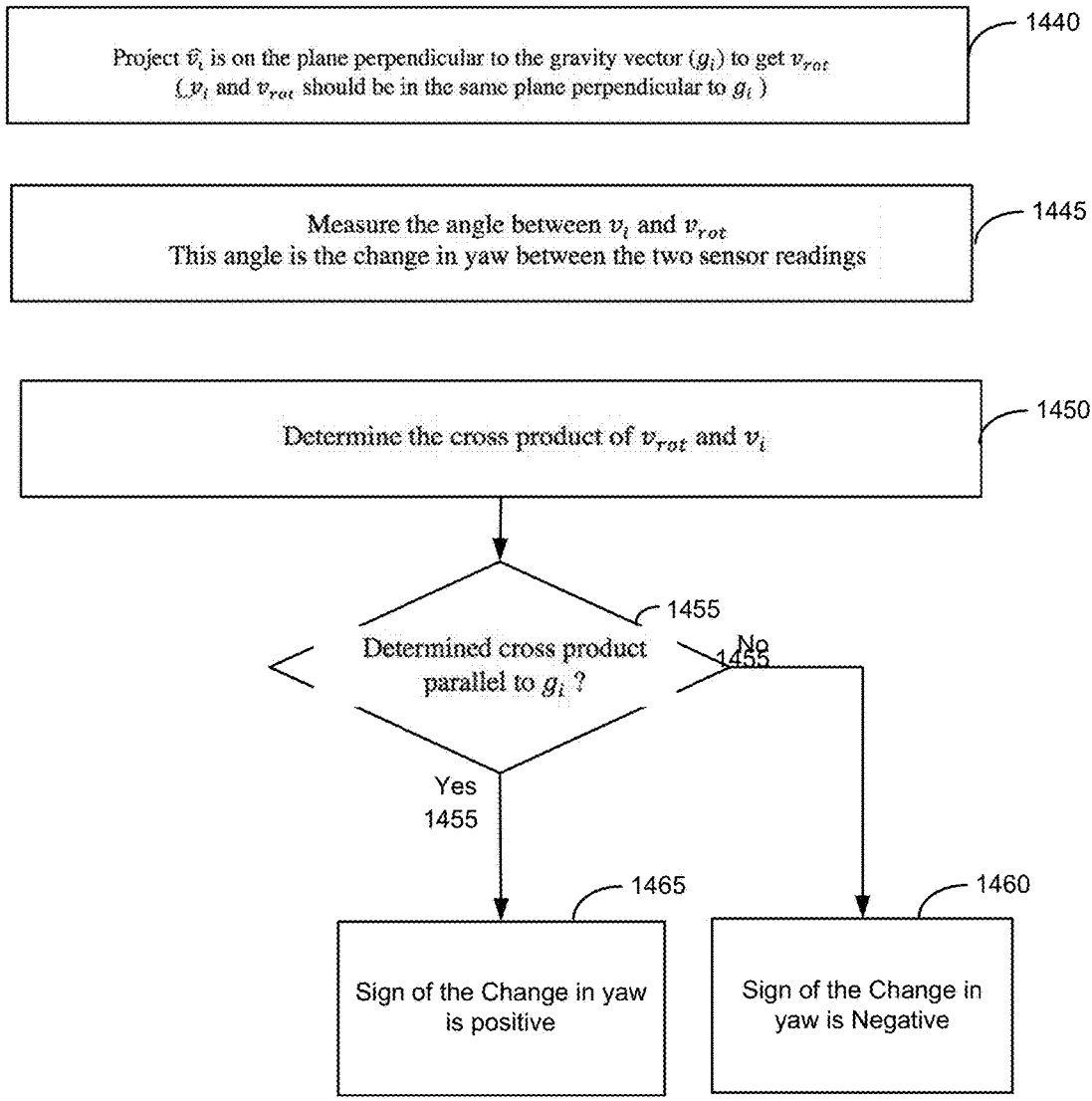

FIG. 14A-B are simplified flowcharts illustrating a method of determining a change in angular position associated with entering a vehicle (e.g., a change in yaw) (1400). As would be appreciated by one having skill in the relevant art(s), given the description herein, the approach described for determining changes in angular position using quaternions in method 1400 can be applied to different processes associated with the angular position of a mobile device. The '501 application uses different approaches to determining yaw, and some of the techniques described herein can be used instead of these approaches.

As would be appreciated by one having skill in the relevant art(s), given the description herein, a problem with determining changes in the angular position of a mobile device is the problem of gimbal lock. Some embodiments described herein can reduce the likelihood of problems associated with gimbal lock by measuring changes in the angular position of a mobile device (also known as changes in yaw), using quaternions. As also would be appreciated by one having skill in the relevant art(s), given the description herein, the approach described for determining changes in angular position using quaternions in method 1400 can be applied to different processes associated with the angular position of a mobile device.

Quaternions represent the angular position of the mobile device with respect to a fixed frame of reference. Quaternions provide information about the reference frame of the mobile device. Method 1400 begins with a determination of a point in time where a mobile device user begins to enter a vehicle (1405). It should be appreciated that, as with some other embodiments described herein, determinations are being made about a user that has a mobile device, based on sensors in the mobile device, without any manipulation of the device by the user. As such, in an example, the mobile device user (1405) is a person merely carrying a mobile device on their person, not actually using the device.

Next, based on sensor readings, two quaternions ($q_i$, $q_{i+1}$) are identified, such quaternions determined at two stages in the vehicle entry (1410). Using the two quaternions, a relative quaternion ($q_{rel}$) is determined that describes ($q_{i+1}$) with respect to ($q_i$). In some embodiments, the relative quaternion is determined by the equation ($q_{rel} = q_i^{-1} \cdot q_{i+1}$) The relative quaternion represents an axis (in $q_i$ reference frame) around which the phone turned and the angle by which it turned.

Method 1410 continues with a gravity vector ($g_i$) in the phone's reference frame being identified (1420). In some embodiments, gravity vector ($g_i$) is determined by the approach described with reference to FIG. 2 above. Next, using $q_{rel}$ and $g_i$, the angle turned by the mobile device around the gravity vector ($g_i$) is estimated. This angle is the change in the yaw angle during that time duration (i→i+1). (1415)

Next, a vector $v_i$ is determined that is perpendicular to $g_i$ (1430), and determined vector $v_i$ is then rotated by $q_{rel}$ to obtain $\hat{v}_i$ (1435), $\hat{v}_i$ is then projected on the plane perpendicular to the gravity vector ($g_i$) to get $v_{rot}$ (1440). The vectors $v_i$ and $v_{rot}$ should be in the same plane perpendicular to $g_i$. In some embodiments, the angle between $v_i$ and $v_{rot}$ is measured (1445), and this angle is the change in yaw between the two sensor readings.

To determine the sign of the yaw angle determination, the cross product of $v_{rot}$ and $v_i$ is determined (1450), and a determination is made as to whether the cross product is parallel to $g_i$. (1455). When the cross product is parallel to $g_i$, the sign of the yaw angle determination is positive (1465) and when the cross product is not parallel to $g_i$, the sign of the yaw angle determination is negative (1460).

In some embodiments, the dot product of the gravity vector ($g_i$) and the rotation rate vector ($r_i$) (both vectors in the phone's reference frame) gives the rotation rate around gravity. This rotation rate signal can then integrated into the obtained change in yaw determination.

It should be appreciated that the specific plot illustrated in FIGS. 14A-B provide a particular example measuring and using changes in angular position of a mobile device. In other embodiments, different approaches can be used to determine changes in angular position, and/or the quaternion approach described can be for different applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of determining vehicle acceleration information with a mobile device disposed in a vehicle, the method comprising:

operating at least one sensor of the mobile device to obtain a plurality of movement measurements;

calculating, based on input from the at least one sensor of the mobile device, a plurality of gravity vectors, each of the plurality of gravity vectors being associated with at least two movement measurements of the plurality of movement measurements;

generating, with a vector analyzer of the mobile device, a gravity angle difference and a gravity magnitude difference associated with at least one movement measurement in which the mobile device was moving in the vehicle of the at least two movement measurements, and determining that the gravity angle difference is above a first threshold and that the gravity magnitude difference is above a second threshold;

removing the at least one movement measurement from the plurality of movement measurements using the plurality of gravity vectors to provide a set of remaining movement measurements of the mobile device; and determining an acceleration measurement for the vehicle using the remaining movement measurements of the mobile device.

2. The method of claim 1, wherein at least one of the plurality of gravity vectors is associated with an accelerometer measurement from the mobile device.

3. The method of claim 1, wherein at least one of the plurality of gravity vectors is associated with a gyroscope measurement from the mobile device.

4. The method of claim 1, wherein determining a plurality of gravity vectors comprises:
   determining a first and second gravity vector over a time span;
   determining that a change between the first and second gravity vectors over the time span is above a threshold; and
   wherein removing a movement measurement from the plurality of movement measurements includes removing a movement measurement associated with the time span.

5. The method of claim 1, further comprising, determining at least one gravity vector using quaternions.

6. The method of claim 1, wherein determining the acceleration measurement for the vehicle using the remaining movement measurements comprises:
   applying principle component analysis to the remaining movement measurements to identify longitudinal acceleration in a direction of travel of the vehicle, lateral acceleration perpendicular to the direction of travel of the vehicle, and vertical acceleration.

7. The method of claim 6, wherein the vertical acceleration is identified by correlating a first acceleration component onto a gravity vector, wherein the lateral acceleration is identified by correlating a second acceleration component with a rotation rate around the gravity vector, and wherein a third acceleration component is identified as the longitudinal acceleration after identifying the vertical acceleration and the lateral acceleration.

8. The method of claim 6, wherein determining the acceleration measurement for the vehicle using the remaining movement measurements further comprises:
   calculating a first mean of the longitudinal acceleration over the remaining movement measurements;
   removing the first mean from the longitudinal acceleration of the remaining movement measurements to generate a remaining longitudinal acceleration;
   calculating a second mean of the lateral acceleration over the remaining movement measurements;
   removing the second mean from the lateral acceleration of the remaining movement measurements to generate a remaining lateral acceleration;
   calculating a third mean of the vertical acceleration over the remaining movement measurements; and
   removing the third mean from the vertical acceleration of the remaining movement measurements to generate a remaining vertical acceleration.

9. The method of claim 8, wherein determining the acceleration measurement for the vehicle using the remaining movement measurements further comprises:
   determining a covariance matrix using the remaining longitudinal acceleration, the remaining lateral acceleration, and the remaining vertical acceleration;
   identifying three largest eigenvalues from the covariance matrix;
   identifying three eigenvectors corresponding to the three largest eigenvalues, wherein the three eigenvectors correspond to the acceleration measurement.

10. The method of claim 6, wherein determining the acceleration measurement for the vehicle using the remaining movement measurements comprises:
    determining a sign of the longitudinal acceleration.

11. A system for determining vehicle acceleration information with a mobile device disposed in a vehicle, the system comprising:
    a processor;
    a memory, having instructions stored thereon, that, when executed by the processor, cause the processor to perform operations, the operations comprising:
    operating at least one sensor of the mobile device to obtain a plurality of movement measurements;
    calculating, based on input from the at least one sensor of the mobile device, a plurality of gravity vectors, each of the plurality of gravity vectors being associated with at least two movement measurements of the plurality of movement measurements;
    generating, with a vector analyzer of the mobile device, a gravity angle difference and a gravity magnitude difference associated with at least one movement measurement in which the mobile device was moving in the vehicle of the at least two movement measurements, and determining that the gravity angle difference is above a first threshold and that the gravity magnitude difference is above a second threshold;
    removing the at least one movement measurement from the plurality of movement measurements using the plurality of gravity vectors to provide a set of remaining movement measurements of the mobile device; and
    determining an acceleration measurement for the vehicle using the remaining movement measurements of the mobile device.

12. The system of claim 11, wherein at least one of the plurality of gravity vectors is associated with an accelerometer measurement from the mobile device.

13. The system of claim 11, wherein at least one of the plurality of gravity vectors is associated with a gyroscope measurement from the mobile device.

14. The system of claim 11, wherein determining a plurality of gravity vectors comprises:
    determining a first and second gravity vector over a time span;
    determining that a change between the first and second gravity vectors over the time span is above a threshold; and
    wherein removing a movement measurement from the plurality of movement measurements includes removing a movement measurement associated with the time span.

15. The system of claim 11, further comprising, determining at least one gravity vector using quaternions.

16. A non-transitory computer readable storage medium having instructions stored thereon, that, when executed by a processor, cause the processor to perform operations comprising:
    operating at least one sensor of a mobile device disposed in a vehicle to obtain a plurality of movement measurements;
    calculating, based on input from the at least one sensor of the mobile device, a plurality of gravity vectors, each of the plurality of gravity vectors being associated with at least two movement measurements of the plurality of movement measurements;
    generating, with a vector analyzer of the mobile device, a gravity angle difference and a gravity magnitude difference associated with at least one movement measurement in which the mobile device was moving in the vehicle of the at least two movement measurements, and determining that the gravity angle difference is above a first threshold and that the gravity magnitude difference is above a second threshold;

removing the at least one movement measurement from the plurality of movement measurements using the plurality of gravity vectors to provide a set of remaining movement measurements of the mobile device; and determining an acceleration measurement for the vehicle using the remaining movement measurements of the mobile device.

17. The non-transitory computer readable storage medium of claim 16, wherein at least one of the plurality of gravity vectors is associated with an accelerometer measurement from the mobile device.

18. The non-transitory computer readable storage medium of claim 16, wherein at least one of the plurality of gravity vectors is associated with a gyroscope measurement from the mobile device.

19. The non-transitory computer readable storage medium of claim 16, wherein determining a plurality of gravity vectors comprises:

determining a first and second gravity vector over a time span;

determining that a change between the first and second gravity vectors over the time span is above a threshold; and wherein removing a movement measurement from the plurality of movement measurements includes removing a movement measurement associated with the time span.

20. The non-transitory computer readable storage medium of claim 16, further comprising, determining at least one gravity vector using quaternions.

* * * * *